(12) United States Patent  (10) Patent No.: US 7,936,740 B2
Fujii  (45) Date of Patent: May 3, 2011

(54) RADIO TRANSMISSION APPARATUS AND METHOD, RADIO RECEPTION APPARATUS AND METHOD, TRANSMITTING AND RECEIVING METHOD, AND RECORDING MEDIUM

(75) Inventor: Masaaki Fujii, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1020 days.

(21) Appl. No.: 11/356,149

(22) Filed: Feb. 17, 2006

(65) Prior Publication Data

US 2006/0209814 A1  Sep. 21, 2006

(30) Foreign Application Priority Data

Feb. 17, 2005 (JP) ................................. 2005-040632
Feb. 4, 2006 (KR) ......................... 10-2006-0010925

(51) Int. Cl.
  *H04B 7/00* (2006.01)
  *H04B 7/208* (2006.01)
  *H04B 7/216* (2006.01)
  *H04B 1/60* (2006.01)
  *H04B 17/02* (2006.01)
(52) U.S. Cl. ............ 370/342; 370/344; 370/310; 455/10
(58) Field of Classification Search .................. 370/210, 370/342, 335, 344, 208; 455/101; 375/130, 375/140, 141, 144, 148
See application file for complete search history.

(56) References Cited

U.S. PATENT DOCUMENTS

| | | | |
|---|---|---|---|
| 6,680,902 B1 * | 1/2004 | Hudson | 370/210 |
| 6,839,335 B1 * | 1/2005 | Sudo | 370/335 |
| 7,526,038 B2 * | 4/2009 | McNamara | 375/267 |
| 2002/0159506 A1 * | 10/2002 | Alamouti et al. | 375/147 |
| 2003/0081562 A1 * | 5/2003 | Iwamatsu et al. | 370/314 |
| 2003/0214927 A1 * | 11/2003 | Atarashi et al. | 370/335 |
| 2004/0131009 A1 * | 7/2004 | Pappalardo et al. | 370/208 |
| 2004/0213187 A1 * | 10/2004 | Fujii | 370/335 |
| 2005/0147025 A1 * | 7/2005 | Auer | 370/203 |

OTHER PUBLICATIONS

Fujii, M., "Pseudo-orthogonal multibeam-time transmit diversity for OFDM-CDMA," Communications, 2002. ICC 2002. IEEE International Conference on , vol. 1, No., pp. 222-226, 2002.*
Xiaodong Cai; Akansu, A.N., "Multicarrier CDMA systems with transmit diversity," Vehicular Technology Conference, 2000. IEEE VTS-Fall VTC 2000. 52nd , vol. 6, No., pp. 2817-2821 vol. 6, 2000.*

(Continued)

*Primary Examiner* — Ayaz R Sheikh
*Assistant Examiner* — Tarell Hampton
(74) *Attorney, Agent, or Firm* — Sughrue Mion, PLLC

(57) ABSTRACT

Provided are a radio transmission apparatus and method, a radio receiving apparatus and method, a transmitting and receiving method, and a recording medium for use in a mobile communication system according to an Orthogonal Frequency Division Multiplexing-Code Division Multiplexing (OFDM-CDM)-based transmission diversity method. The radio transmitter codes transmission data into a plurality of time-space codes, generates spread signals by respectively mapping a plurality of spread codes and the time-space codes, and transmits the spread signals via a plurality of transmission antennae, each of the spread codes containing a combination of codes whose signs are alternately equal and opposite in units of specific spreading lengths. Accordingly, it is possible to transmit data without a feedback of control information from a radio receiver.

18 Claims, 15 Drawing Sheets

OTHER PUBLICATIONS

Wei Sun; Hongbin Li, "Blind channel identification for multicarrier CDMA systems with transmit diversity," Communications, 2002. ICC 2002. IEEE International Conference on , vol. 2, No., pp. 727-731 vol. 2, 2002.*

Zekavat, S.A.; Nassar, C.R.; Shattil, S., "Merging multicarrier CDMA and oscillating-beam smart antenna arrays: exploiting directionality, transmit diversity, and frequency diversity," Communications, IEEE Transactions on , vol. 52, No. 1, pp. 110-119, Jan. 2004.*

Auffray, J.M.; Helard, J.F., "Performance of multicarrier CDMA technique combined with space-time block coding over Rayleigh channel," Spread Spectrum Techniques and Applications, 2002 IEEE Seventh International Symposium on , vol. 2, No., pp. 348-352 vol. 2, Sep. 2-5, 2002.*

* cited by examiner

RADIO TRANSMISSION APPARATUS AND METHOD, RADIO RECEPTION APPARATUS AND METHOD, TRANSMITTING AND RECEIVING METHOD, AND RECORDING MEDIUM

CROSS-REFERENCE TO RELATED PATENT APPLICATIONS

This application claims the priority of Japanese Patent Application No. 2005-40632, filed on Feb. 17, 2005 and Korean Patent Application No. 10-2006-0010925, filed on Feb. 4, 2006, the disclosure of which is incorporated herein in its entirety by reference.

BACKGROUND OF THE INVENTION

1. Field of the Invention

The present invention relates to a radio transmission apparatus and method, a radio reception apparatus and method, a transmitting and receiving method, and a recording medium for use in a mobile communication system according to a transmission diversity method based on Orthogonal Frequency Division Multiplexing-Code Division Multiplexing (OFDM-CDM).

2. Description of the Related Art

The more mobile communication systems are being developed, the higher the levels of the bandwidths, frequencies, and reliabilities thereof are needed. Thus, a transmission diversity method that improves transmission quality without extending a radio unit of a terminal becomes very desirable. Also, an OFDM-CDM method has been known as being very efficient in transmitting low-rate data or control data, or transmitting data in an environment in which an interference between cells are serious. Therefore, conventional transmission diversity-based methods will first be described, and then, a conventional OFDM-CDM-based method will be described.

Two examples of the transmission diversity-based methods will be described. One of the conventional transmission diversity-based methods uses two antenna branches. FIG. 1 is a block diagram of a radio transmitter $1d$ that uses 2-row, 2-column Space-Time Block Code (STBC) and has two transmission antennae 112-1 and 112-2, and a radio receiver $2d$ that receives signals from the radio transmitter $1d$. The radio transmitter $1d$ space-time codes a pair of transmission symbols $s=[s_1, s_2]^T$ by using a 2-row, 2-column STBC unit 100, based on a 2-row, 2-column STBC matrix expressed in the following equation, and transmits the time-space coded symbols via the transmission antenna 112-1 and 112-2.

$$S = \begin{bmatrix} s_1 & s_2 \\ -s_2^* & s_1^* \end{bmatrix} \quad (1)$$

The 2-row, 2-column 2-row, 2-column STBC unit 100 respectively transmits the symbol signals $s_1$ and $s_2$ via the transmission antennae 112-1 and 112-2 at a first instant of time. Then, the 2-row, 2-column STBC unit 100 respectively transmits the symbol signals $-s_2^*$ and $s_1^*$ via the transmission antenna 112-1 and 112-2 at a second instant of time. If the radio receiver $2d$ respectively receives signals $r_1$ and $r_2$ at the first instant of time and the second instant of time via a receiving antenna 120, the received signals $r_1$ and $r_2$ are expressed as follows:

$$\begin{cases} r_1 = h_1 s_1 + h_2 s_2 \\ r_2 = -h_1 s_2^* + h_2 s_1^* \end{cases} \quad (2)$$

wherein $h_1$ and $h_2$ denote channel responses received from the radio receiver $2d$ via the transmission antennae 112-1 and 112-2. That is, $h_1$ and $h_2$ indicate values generated from the received signals by a channel estimation unit 102. A received signal vector is expressed in a matrix by using the values $h_1$ and $h_2$, as follows:

$$r = \begin{bmatrix} r_1 \\ r_2^* \end{bmatrix} \quad (3)$$

$$= \begin{bmatrix} h_1 & h_2 \\ h_2^* & -h_1^* \end{bmatrix} \begin{bmatrix} s_1 \\ s_2 \end{bmatrix}$$

Also, a channel matrix H is expressed by using the values $h_1$ and $h_2$, as follows:

$$H = \begin{bmatrix} h_1 & h_2 \\ h_2^* & -h_1^* \end{bmatrix} \quad (4)$$

A transmission signal estimated value vector $\hat{s}$ is decoded by a time-space decoder 101 of the radio receiver $2d$ by using a conjugate transpose matrix $H^H$ of the channel matrix H, as follows:

$$\hat{s} = H^H r \quad (5)$$

$$= \begin{bmatrix} |h_1|^2 + |h_2|^2 & 0 \\ 0 & |h_1|^2 + |h_2|^2 \end{bmatrix} \begin{bmatrix} s_1 \\ s_2 \end{bmatrix}$$

$$= (|h_1|^2 + |h_2|^2)s$$

As expressed in Equation (5), since two symbol signals are transmitted in two time slots, the rate of transmission is a full rate, thus realizing a maximum rate of diversity of a combination of two transmission antenna branches.

Next, a closed loop transmission antenna diversity method, which is the other conventional transmission diversity-based method, which uses two pairs of 2-row, 2-column STBC and four antenna branches, will be described. FIG. 2 is a block diagram of a radio transmitter $1e$ that has four transmission antennae 112-1 through 112-4 and performs closed loop transmission antenna diversity, and a radio receiver $2e$ (see J. Akhtar and D. Gesbert, "Partial Feedback-Based Orthogonal Block Coding", Proc. VTC' 03-Spring, pp 287-291, Korea, April 2003).

2-row, 4-column STBC performed by a 2-row, 4-column time-space decoder 110 of the radio transmitter $1e$ is given by:

$$S = \begin{bmatrix} s_1 & s_2 & bs_1 & bs_2 \\ -s_2^* & s_1^* & -bs_2^* & bs_1^* \end{bmatrix} \quad (6)$$

wherein b denotes binary code having a value of +1 or −1, computed by a feedback value calculator 126 of the radio receiver $2e$. A method that uses the binary code b (hereinafter referred to as "control information") is referred to as an STBC-Group Coherent Coding (STBC-GCC) method.

A received signal vector in the radio receiver 2e is expressed in a matrix, as follows:

$$r = \begin{bmatrix} r_1 \\ r_2^* \end{bmatrix} \quad (7)$$

$$= \begin{bmatrix} h_1 + bh_3 & h_2 + bh_4 \\ h_2^* + bh_4^* & -h_1^* - bh_3^* \end{bmatrix} \begin{bmatrix} s_1 \\ s_2 \end{bmatrix}$$

Therefore, an equivalence channel matrix $\tilde{H}$ is given by:

$$\tilde{H} = \begin{bmatrix} h_1 + bh_3 & h_2 + bh_4 \\ h_2^* + bh_4^* & -h_1^* - bh_3^* \end{bmatrix} \quad (8)$$

In this case, a transmission signal estimated vector s may be decoded by using a conjugate transpose matrix $\tilde{H}^H$ of the equivalence channel matrix $\tilde{H}$, as follows:

$$\hat{s} = \tilde{H}^H r \quad (9)$$

$$= \begin{bmatrix} \alpha + \beta & 0 \\ 0 & \alpha + \beta \end{bmatrix} \begin{bmatrix} s_1 \\ s_2 \end{bmatrix}$$

$$= (\alpha + \beta)s$$

wherein $\alpha$ and $\beta$ are respectively given by:

$$\alpha = \sum_{i=1}^{4} |h_i|^2 \quad (10)$$

$$\beta = 2b[Re(h_1^*h_3) + Re(h_2 h_4)] \quad (11)$$

In the STBC-GCC method, since a transmitting side controls the binary code b so that $\beta$ has a positive value, two symbol signals can be transmitted in two time slots, and thus, the rate of transmission becomes a full rate. Also, both a space diversity gain a for four transmission antenna branches, and an array gain $\beta$ are obtained.

Next, an example of the OFDM-CDM-based prior art will be described. FIG. 3 is a block diagram of a OFDM-CDM-based radio transmitter 1f and radio receiver 2f. FIG. 4 is a conceptual diagram of two-dimensional (2D) spreading applied to an OFDM-CDM method. Referring to FIG. 4, the 2D spreading is performed such that the original symbol signal is spread in the directions of frequency and time. The spreading of the original symbol signal in the direction of frequency is performed such that transmitted symbol signals are serial-to-parallel transformed by a serial-to-parallel transformer 31 of the radio transmitter 1f and the original symbol signal is copied as symbol signals corresponding to a rate of frequency-direction spreading $SF_{Freq}$ by copying units 132-1 through 132-n. The spreading of the original symbol signal in the direction of time is performed such that symbol signals, which are respectively copied by the copying units 132-1 through 132-n, are respectively spread by spreaders 1321-1, ..., 1321-m, ..., 132n-1, ..., 132n-m based different spreading codes corresponding to a rate of time-direction spreading $SF_{Time}$. In this case, in 2D spreading, since the rate of spreading $SF = SF_{Time} \times SF_{Freq}$ and each symbol signal is copied in the direction of frequency, the length of each symbol signal is repeatedly spread by using the spreading code corresponding to the rate of spreading SF at each rate of time-direction spreading $SF_{Time}$. Also, the 2D spread signals are respectively allocated to sub carriers in a frequency domain, and input as sub carriers to a code multiplexer 133.

Next, a code multiplexer 133 code-multiplexes the spread signals that are spread by using different spreading codes. A transforming transmission unit 134 performs Inverse Fast Fourier Transform (hereinafter referred to as "IFFT") on the code-multiplexed signals to transform the sub carriers into time-domain signals, inserts a Guard Interval (GI) into the time-domain signals to prevent an interference between code, and transmits the time-domain signals via a transmission antenna 135.

In the radio receiver 2f, a receiving transformer 142 removes the GI from each of the time-domain signals received via an receiving antenna 141, and performs Fast Fourier Transform (hereinafter referred to as "FFT") on the time-domain signals to transform them into sub carriers. Next, the sub carriers are despread by despreaders 1431-1, ..., 1431-m, ..., 143n-1, ..., 143n-m in the direction of time, and then, the despread signals are mixed by mixers 143-1 through 143-n in the direction of frequency. Lastly, the mixed signals are parallel-to-serial transformed by a parallel-to-serial transformer 144 in the direction of frequency, and then output as signals to be reproduced.

In an environment in which the above methods are actually performed, a receiving side includes a plurality of receivers. The above closed loop transmission antenna diversity method (the closed loop STBC-GCC) that uses four transmission antenna branches needs a feedback of control information from the receiving side, and therefore, receives control information from the plurality of the receivers. FIG. 5 is a block diagram of a radio transmitter 1g, and two radio receivers 2g-1 and 2g-2 that respectively provide feedbacks of control information b1 and b2.

However, when the same signal is transmitted to a plurality of users in an actual mobile telecommunication network, the radio transmitter 1g corresponds to a base station or an access point, and the radio receivers 2g-1 and 2g-2 correspond to mobile phones of the users. In this case, since a channel gain between the radio transmitter 1g and the radio receiver 2g-1 is different from a channel gain between the radio transmitter 1g and the radio receiver 2g-2, the feedbacks received from the radio receivers 2g-1 and 2g-2 are not always the same. Specifically, it is assumed that channel responses from four transmission antennae 112-1 through 112-4 of the radio transmitter 1g to the radio receiver 2g-1 are $h_1$, $h_2$, $h_3$, and $h_4$, and channel responses from the four transmission antennae 112-1 through 112-4 of the radio transmitter 1g to the radio receiver 2g-2 are $h_5$, $h_6$, $h_7$, and $h_8$. In this case, an array gain $\beta_1$ in the radio receiver 2g-1 and an array gain $\beta_2$ in the radio receiver 2g-2 are given by:

$$\beta_1 = 2b_1\{Re(h_1^*h_3) + Re(h_2 h_4)\} \quad (12)$$

$$\beta_2 = 2b_2\{Re(h_5^*h_7) + Re(h_6 h_8)\} \quad (13)$$

If the control information $b_1$ has a value of 1 when the array gain $\beta_1$ has a positive value and the control information $b_2$ has a value of −1 when the array gain $\beta_2$ has a positive value, the control information $b_1$ and $b_2$ have opposite values, thus preventing the radio transmitter 1g from being controlled. If both the control information $b_1$ and $b_2$ have the value of 1, the array gain $\beta_2$ in the radio receiver 2g-2 has a negative value and the sum of gains $\alpha_2 + \beta_2$ in the radio receiver 2g-2 is less than $\alpha_2$, thereby causing degradation of transmission quality.

SUMMARY OF THE INVENTION

The present invention provides a radio transmission apparatus that can transmit data without a feedback of control information from a radio receiver according to a Space-Time Block Code-Group Coherent Coding (STBC-GCC) method and be applied to an STBC-GCC-based Orthogonal Frequency Division Multiplexing-Code Division Multiplexing (OFDM-CDM) method, a radio receiving apparatus, a radio transmission method, a radio receiving method, a transmitting and receiving method, and a recording medium therefor.

According to an aspect of the present invention, there is provided a radio transmission method comprising coding transmission data to a plurality of time-space codes; generating spread signals by respectively mapping a plurality of spread codes and the time-space codes, each of the spread codes containing a combination of codes whose signs are alternately equal and opposite; and transmitting the spread signals via a plurality of transmission antennae.

According to another aspect of the present invention, there is provided a radio transmission apparatus including an encoder coding transmission data into a plurality of time-space codes; a spreader generating a plurality of spread signals by extracting a plurality of combinations of codes from the time-space codes and spreading the time-space codes by mapping a plurality of spread codes and each pair of the extracted time-space codes, each of the spread codes containing a combination of codes whose signals are alternately equal and opposite in units of specific spreading lengths; and a transmitter transmitting the generated spread signals via a plurality of transmission antennae.

According to another aspect of the present invention, there is provided a computer readable medium having recorded thereon a computer program for executing the above radio transmission method in a computer.

According to another aspect of the present invention, there is provided a radio reception method comprising receiving signals via a plurality of transmission antennae; restoring time-space codes by dispreading spread signals contained in the signals, based on one of a plurality of spread codes, each containing a combination of codes whose codes are alternately equal and opposite; and decoding the restored time-space codes.

According to another aspect of the present invention, there is provided a radio reception apparatus comprising a receiver receiving signals via a plurality of transmission antennae and outputting spread signals contained in the signals; a despreader restoring time-space codes by dispreading the spread signals from the receiver in units of specific spreading lengths, based on one of a plurality of spread codes, each containing a combination of codes whose signs are alternately equal and opposite in the units of the spreading lengths; a decoder decoding the restored time-space codes; and a mixer reproducing data by mixing the decoded time-space codes.

According to another aspect of the present invention, there is provided a computer readable medium having recorded thereon a computer program for executing the above radio reception method in a computer.

According to another aspect of the present invention, there is provided a computer readable medium having recorded thereon a computer program for executing the above radio transmission method in a computer.

According to another aspect of the present invention, there is provided a transmitting and receiving method performed in a radio communication system which comprises a radio transmitter transmitting signals via a plurality of transmission antennae and a radio receiver receiving the signals from the radio transmitter, the method comprising the radio transmitter coding the signals into a plurality of time-space codes; the radio transmitter extracting a plurality of combinations of codes from the coded time-space codes; the radio transmitter generating spread signals by spreading the time-space codes by mapping a plurality of spread codes and each pair of the time-space codes, each of the spread codes containing a combination of codes whose signs are alternately equal and opposite in units of specific spreading lengths; the radio transmitter transmitting the generated spread signals via a plurality of transmission antennae; the radio receiver receiving signals via a plurality of transmission antennae and outputting the spread signals contained in the received signals; the radio receiver restoring the time-space codes by dispreading the spread signals in units of the specific spreading lengths, based on one of a plurality of spreading codes, each containing a combination of codes whose signs are alternately equal and opposite in the units of the specific spreading lengths; the radio receiver decoding the restored time-space codes; and the radio receiver reproducing data by mixing the decoded time-space codes.

According to another aspect of the present invention, there is provided a computer readable medium having embodied thereon a computer program for making a computer of a radio transmitter, which transmits signals via a plurality of transmission antennae, act as: an encoder coding the transmitted signals into a plurality of time-space codes; a spreader generating a plurality of spread signals by extracting a plurality of combinations of codes from the time-space codes and spreading the time-space codes by mapping a plurality of spread codes and each pair of the extracted time-space codes, each of the spread codes containing a combination of codes whose signs are alternately equal and opposite in units of specific spreading lengths; and a transmitter transmitting the generated spread signals via a plurality of transmission antennae.

According to another aspect of the present invention, there is provided a computer readable medium having recorded thereon a computer program for executing the above radio transmission method in a computer.

According to another aspect of the present invention, there is provided a computer readable medium having embodied thereon a computer program for making a computer of a radio receiver, which receives signals via a plurality of transmission antennae, act as: a receiver receiving signals via a plurality of transmission antennae and outputting spread signals contained in the signals; a despreader restoring time-space codes by dispreading the spread signals from the receiver in units of specific spreading lengths, based on one of a plurality of spread codes, each containing a combination of codes whose signs are alternately equal and opposite in the units of the spreading lengths; a decoder decoding the restored time-space codes; and a mixer reproducing data by mixing the decoded time-space codes.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 6:
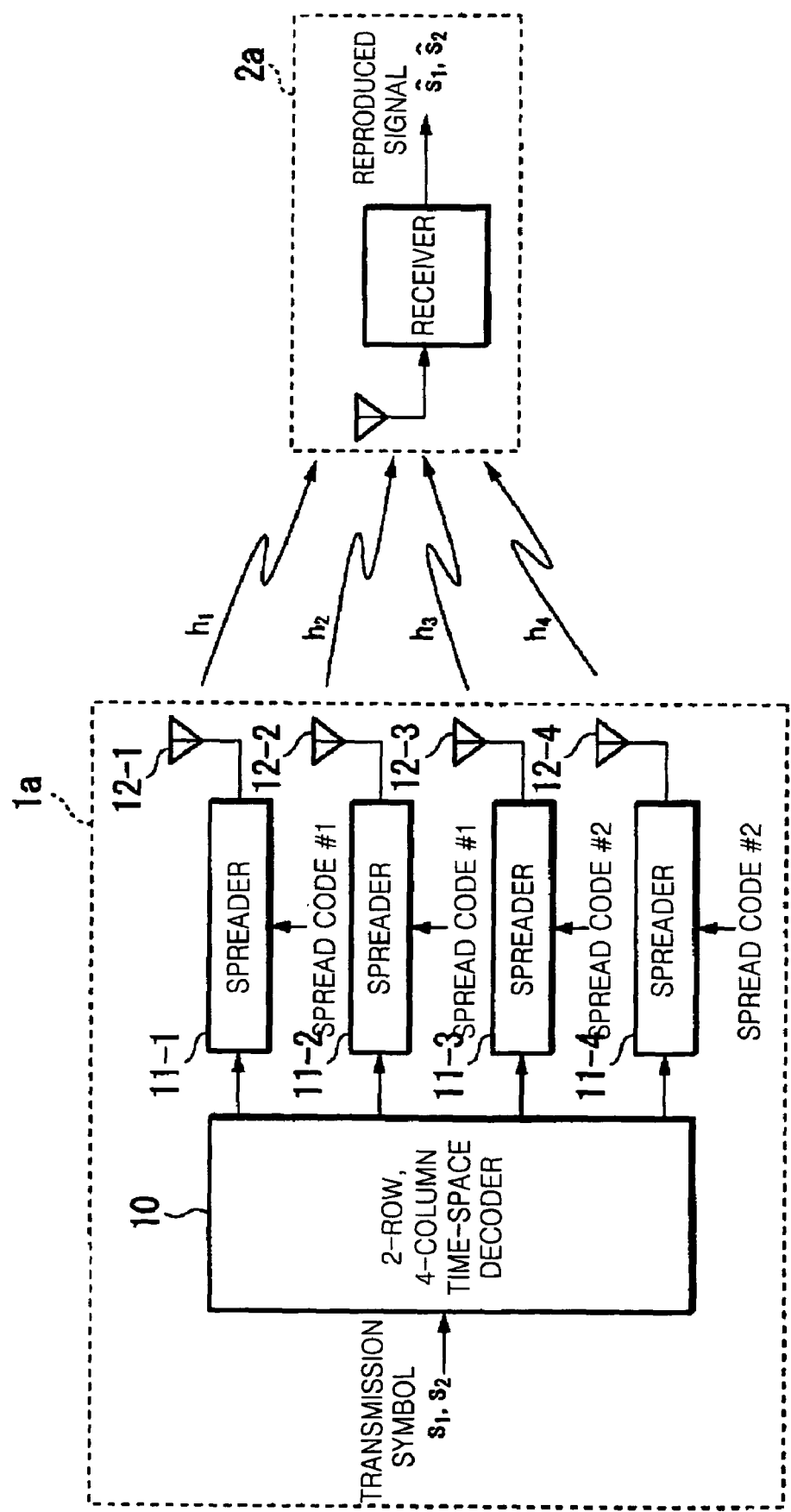
FIG. 6 is a block diagram illustrating the internal construction of a radio transmitter and the relationship between the radio transmitter and a radio receiver, according to an embodiment of the present invention.

Hereinafter, a radio transmitter and a radio receiver according to exemplary embodiments of the present invention will be described with reference to the accompanying drawings. FIG. 6 is a block diagram illustrating the internal construction of a radio transmitter $1a$ and the relationship of radio signals exchanged between the radio transmitter $1a$ and a radio receiver $2a$, according to an embodiment of the present invention.

Referring to FIG. 6, a 2-row, 4-column time-space decoder 10 of the radio transmitter $1a$ performs time-space coding on a pair of transmission symbol signals $S=[s_1, s_2]^T$. Each of spreading units 11-1 through 11-4 generates a spread signal by spreading the time-space coded transmission symbol signal for the branch of a corresponding transmission antenna 12-1, . . . , or 12-4, based on Walsh-Hadmard (hereinafter referred to as "WH") code. Transmission antennae 12-1 through 12-4 transmit the spread signals generated by the spreading units 11-1 through 11-4.

Figure 7:
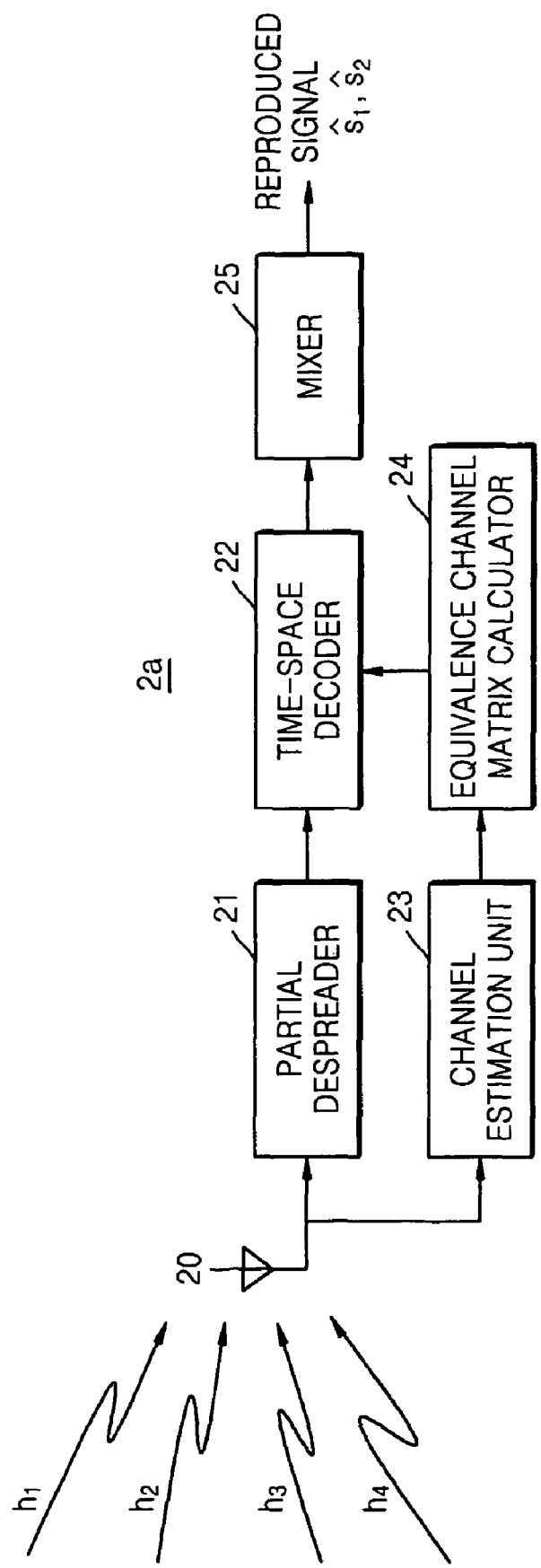
FIG. 7 is a block diagram of a radio receiver according to an embodiment of the present invention.

FIG. 7 is a block diagram of the radio receiver $2a$, illustrated in FIG. 6, which corresponds to the radio transmitter $1a$ of FIG. 6, according to an embodiment of the present invention. A partial despreader 21 partly despreads the signals received via a receiving antenna 20 in units of the spreading length SFTime of a mother code layer, which corresponds to a specific spreading length described in the claims of the present invention, over two spreading regions having a length of 2SF. In this case, one of WH codes input to the spreaders 11-1 and 11-2 and the spreaders 11-3 and 11-4 of the radio transmitter $1a$ is used for partial despreading, and the number of partial dispread segments $M=SF/SF_{Time}$.

A channel estimation unit 23 computes channel response estimated values $\hat{h}_1$, $\hat{h}_2$, $\hat{h}_3$, and $\hat{h}_4$ based on the signals received via the receiving antenna 20, and outputs them. An equivalence channel matrix calculator 24 computes an equivalence channel matrix based on the channel response estimated values $\hat{h}_1$, $\hat{h}_2$, $\hat{h}_3$, and $\hat{h}_4$. A time-space decoder 22 decodes the despread signal in each partially spread segment, received from the partial despreader 21, based on the equivalence channel matrix $\hat{H}$ received from the equivalence channel calculator 24. A mixer 25 mixes the decoded signals received from the time-space decoder 22.

The operations of the radio transmitter $1a$ and the radio receiver $2a$ will now be described.

When a pair of transmission symbol signals $s=[s_1, s_2]^T$ are input to the radio transmitter $1a$, the 2-row, 2-column time-space decoder 10 performs time-space coding them to obtain a 2-row, 4-column STBC matrix S as follows:

$$S = \begin{bmatrix} s_1 & s_2 & s_1 & s_2 \\ -s_2^* & s_1^* & -s_2^* & s_1^* \end{bmatrix} \quad (14)$$

The STBC matrix S repeatedly performs 2-row, 2-column STBC that uses two transmission antenna branches, so that it can be applied to four transmission antenna branches.

Next, the spreaders 11-1 through 11-4 generate spread signals by performing spreading on the STBC matrix S by using the WH code. In Equation (14), the WD code at a second row, a second column of the STBC matrix on the right side of the STBC matrix, i.e., the WH code input to the spreaders 11-1 and 11-2, is different from the WD code at a second row, a second column of the STBC matrix on the left side of the STBC matrix, i.e., the WH code input to the spreaders 11-3 and 11-4. That is, when comparing two of the WH codes, the signs of spread codes are alternately equal and opposite in units of the spreading lengths of an upper layer, i.e., the mother code layer. Specifically, when the spreading length $SF_{Time}$ of the mother code layer is 8, if the rate of spreading SF=64, the following two WH codes $w_{57}$ and $w_{61}$ are used:

$$w_{57} = [\underbrace{1, -1, -1, 1, -1, 1, 1, -1,}_{SF_{Time}(1)} \underbrace{1, -1, -1, 1, -1, 1, 1, -1,}_{SF_{Time}(2)} \quad (15)$$

$$\underbrace{1, -1, -1, 1, -1, 1, 1, -1,}_{SF_{Time}(3)} \underbrace{1, -1, -1, 1, -1, 1, 1, -1, \ldots}_{SF_{Time}(4)}]^T$$

$$w_{61} = [\underbrace{1, -1, -1, 1, -1, 1, 1, -1,}_{SF_{Time}(1)} \underbrace{-1, 1, 1, -1, 1, -1, -1, 1,}_{SF_{Time}(2)} \quad (16)$$

$$\underbrace{1, -1, -1, 1, -1, 1, 1, -1,}_{SF_{Time}(3)} \underbrace{-1, 1, 1, -1, 1, -1, -1, 1, \ldots}_{SF_{Time}(4)}]^T$$

If a code portion of the spreading length $SF_{Time}$ is a partial spread segment, that the signs of the spread codes are alternately equal and opposite means that the signs of the codes in the first and third partial spread segments expressed in Equation (15) are the same as those of the codes in the first and third partial spread segments in Equation (16) but the signs of the codes in the second and fourth spread segments Equation (15) are different from those of the codes in the second and fourth partial spread segments in Equation (16). Signal vectors $u_1(1)$, $u_2(1)$, $u_3(1)$, and $u_4(1)$ obtained by spreading the transmission symbol in a first row of the 2-row, 4-column STBC matrix, i.e., in a first time slot, for the transmission antennae 12-1 through 12-4, are given by:

$$\begin{cases} u_1(1) = s_1 w_{57} \\ u_2(1) = s_2 w_{57} \\ u_3(1) = s_1 w_{61} \\ u_4(1) = s_2 w_{61} \end{cases} \quad (17)$$

Similarly, signal vectors $u_1(2)$, $u_2(2)$, $u_3(2)$, and $u_4(2)$, which are obtained by spreading transmission symbol in a second time slot, for the transmission antennae 12-1 through 12-4, are given by:

$$\begin{cases} u_1(2) = -s_2^* w_{57} \\ u_2(2) = s_1^* w_{57} \\ u_3(2) = -s_2^* w_{61} \\ u_4(2) = s_1^* w_{61} \end{cases} \quad (18)$$

Next, the radio receiver 2a receives the signal from the radio transmitter 1a. In this case, a received signal vector $r_1$ corresponding to a transmission signal in the first row of the STBC matrix S (the transmission signal in the first time slot) that is generated from the transmission symbol signal received from the radio transmitter 1a, is given by:

$$r_1 = h_1 u_1(1) + h_2 u_2(1) + h_3 u_3(1) + h_4 u_4(1) \quad (19)$$

A received signal vector $r_2$ corresponding to a transmission signal in the second row of the STBC matrix (the transmission signal in the second time slot) is given by:

$$r_2 = h_1 u_1(2) + h_2 u_2(2) + h_3 u_3(2) + h_4 u_4(2) \quad (20)$$

The partial despreader 21 performs partial despreading on the received signal vectors by using one of the two WH codes $w_{57}$ and $w_{61}$ which are used by the radio transmitter 1a, for each partial spread segment. Partial despreading that uses the WH code $w_{57}$ according to an embodiment of the present invention will now be described. Partial despreading performed in a first partial spread segment of the received signal vector $r_1$ is given by:

$$\begin{aligned} y_1 &= h_1 s_1 + h_2 s_2 + h_3 s_1 + h_4 s_2 \\ &= (h_1 + h_3) s_1 + (h_2 + h_4) s_2 \end{aligned} \quad (21)$$

Partial despreading performed in a first partial spread segment of the received signal vector $r_2$ is given by:

$$\begin{aligned} y_2 &= -h_1 s_2^* + h_2 s_1^* - h_3 s_2^* + h_4 s_1^* \\ &= (h_2 + h_4) s_1^* + (-h_1 - h_3) s_2^* \end{aligned} \quad (22)$$

Partial despreading performed in a second partial spread segment of the received signal vector $r_1$ is given by:

$$\begin{aligned} y_3 &= h_1 s_1 + h_2 s_2 - h_3 s_1 - h_4 s_2 \\ &= (h_1 - h_3) s_1 + (h_2 - h_4) s_2 \end{aligned} \quad (23)$$

Partial despreading performed in a second partial spread segment of the received signal vector $r_2$ is given by:

$$\begin{aligned} y_4 &= -h_1 s_2^* + h_2 s_1^* + h_3 s_2^* - h_4 s_1^* \\ &= (h_2 - h_4) s_1^* + (-h_1 + h_3) s_2^* \end{aligned} \quad (24)$$

A vector $y_1$ of signals $y_1$ and $y_2$, for a first partial spread segment that is partially despread, which are represented in a matrix by using an equivalence channel matrix $\tilde{H}_1$, is given by:

$$\begin{aligned} y_1 &= \begin{bmatrix} y_1 \\ y_2^* \end{bmatrix} \\ &= \begin{bmatrix} h_1 + h_3 & h_2 + h_4 \\ h_2^* + h_4^* & -h_1^* - h_3^* \end{bmatrix} \begin{bmatrix} s_1 \\ s_2 \end{bmatrix} \\ &= \tilde{H}_1 s \end{aligned} \quad (25)$$

Also, a vector $y_2$ of signals $y_3$ and $y_4$, for a second partial spread segment that is partially despread, which are represented in a matrix by using an equivalence channel matrix $\tilde{H}_{-1}$, is given by:

$$\begin{aligned} y_2 &= \begin{bmatrix} y_3 \\ y_4^* \end{bmatrix} \\ &= \begin{bmatrix} h_1 - h_3 & h_2 - h_4 \\ h_2^* - h_4^* & -h_1^* + h_3^* \end{bmatrix} \begin{bmatrix} s_1 \\ s_2 \end{bmatrix} \\ &= \tilde{H}_{-1} s \end{aligned} \quad (26)$$

Signal vectors $z_1$ and $z_2$ obtained by decoding the vectors $y_1$ and $y_2$ by using conjugate transpose matrices $\tilde{H}_1^H$ and $\tilde{H}_{-1}^H$ of the equivalence channel matrices $\tilde{H}_1$ and $\tilde{H}_{-1}$, which are computed by the equivalence channel matrix calculator 24, are given by:

$$\begin{aligned} z_1 &= \tilde{H}_1^H y_1 \\ &= \begin{bmatrix} \alpha + \beta & 0 \\ 0 & \alpha + \beta \end{bmatrix} \begin{bmatrix} s_1 \\ s_2 \end{bmatrix} \\ &= (\alpha + \beta) s \end{aligned} \quad (27)$$

$$\begin{aligned} z_2 &= \tilde{H}_{-1}^H y_2 \\ &= \begin{bmatrix} \alpha - \beta & 0 \\ 0 & \alpha - \beta \end{bmatrix} \begin{bmatrix} s_1 \\ s_2 \end{bmatrix} \\ &= (\alpha - \beta) s \end{aligned} \quad (28)$$

An estimated vector $\hat{s}$ of a transmission signal, which is obtained by mixing the signal vectors z of the decoded signals by the mixer 25, is given by:

$$\begin{aligned} \hat{s} &= \frac{1}{M} \left( \sum_{m=1}^{M/2} z_{2m-1} + z_{2m} \right) \\ &= \frac{1}{M} \left( \sum_{m=1}^{M} \alpha \right) s \\ &= \alpha s \end{aligned} \quad (29)$$

As expressed in Equation (29), the WH code in which the signs of the spread codes are alternately equal and opposite in unit of the spreading lengths of the mother code layer, is used, thereby denying an array gain β and obtaining a space diversity gain α. Accordingly, it is possible to realize an open loop transmission diversity method that does not need a feedback of control information by sacrificing the array gain β.

Figure 8:
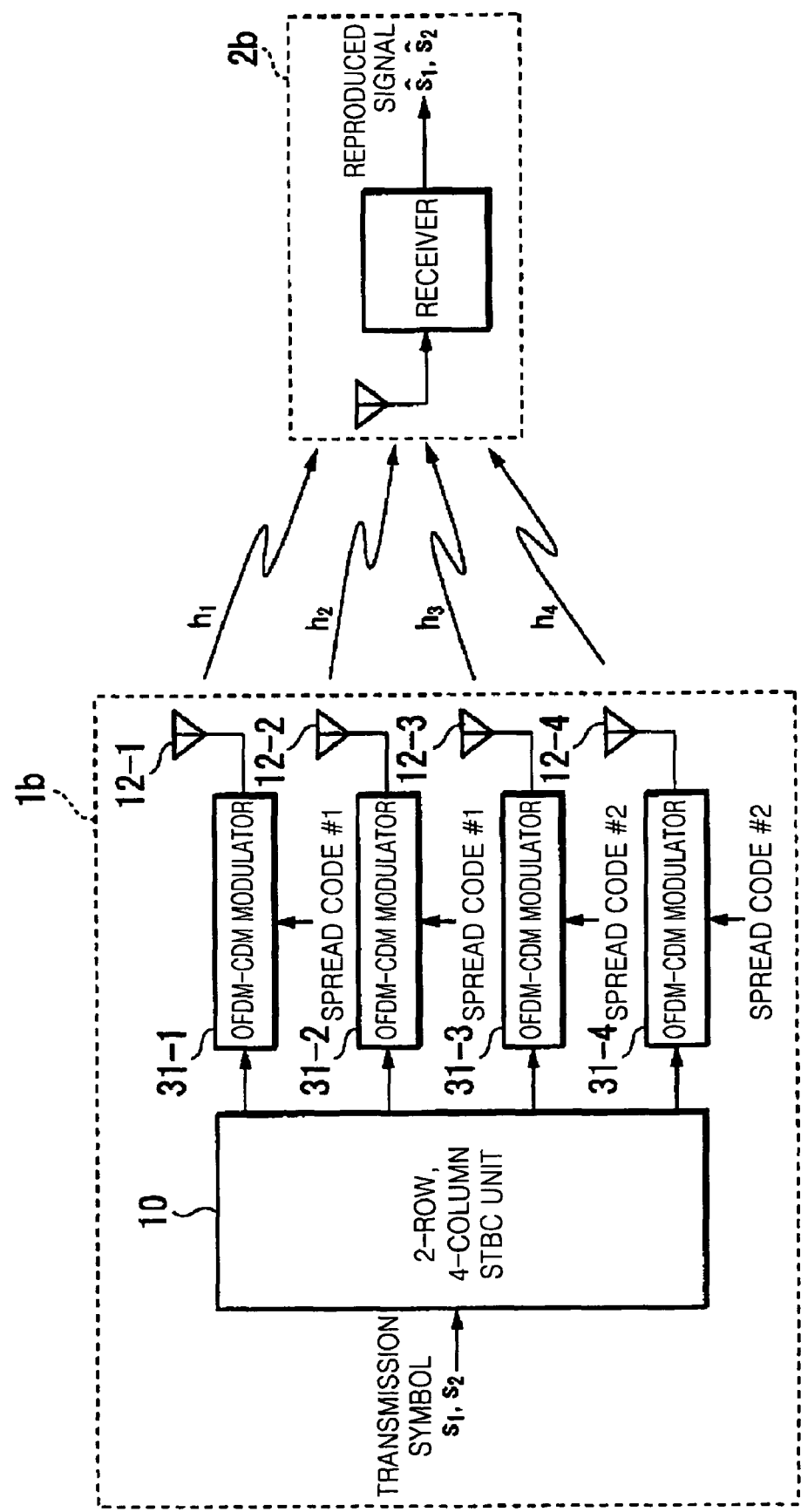
FIG. 8 is a block diagram illustrating the internal construction of a radio transmitter and the relationship between the radio transmitter and a radio receiver, according to another embodiment of the present invention.

Hereinafter, a radio transmitter and a radio receiver for an open loop transmission diversity method according to an OFDM-CDM method, according to another embodiment of the present invention, will be described with reference to the accompanying drawings. FIG. 8 is a block diagram illustrating the internal construction of a radio transmitter 1b and the relationship of radio signals used between the radio transmitter 1b and a radio receiver 2b, according to another embodiment of the present invention.

Referring to FIG. 8, the construction of the radio transmitter 1b is the same as that of the radio transmitter 1a illustrated in FIG. 6 except for OFDM-CDM modulators 31-1 through 31-4. Therefore, the radio transmitter 1b will be described with respect to the OFDM-CDM modulators 31-1 through 31-4. The same constituent elements as the radio transmitter 1a are denoted by the same reference numerals as in FIG. 6, and a description of their operations or characteristics are omitted in this disclosure.

Figure 1:
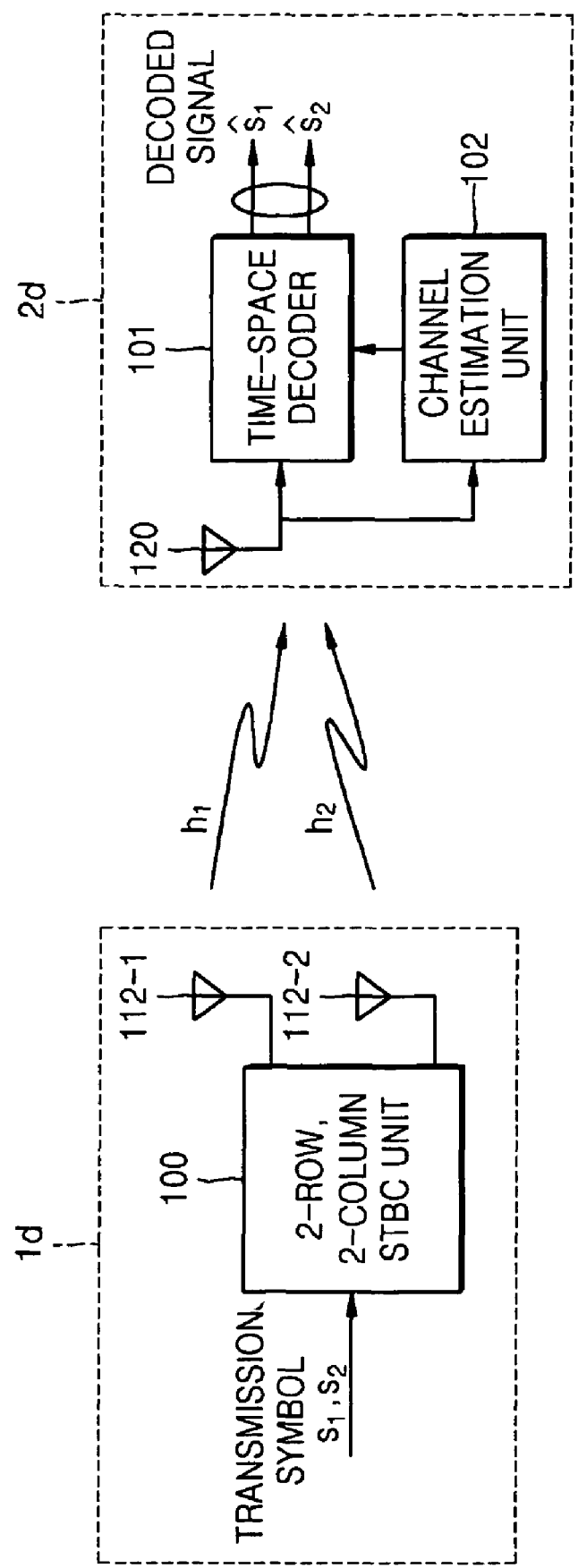
FIG. 1 is a block diagram of a conventional transmission diversity method that uses two transmission antennae.
Figure 2:
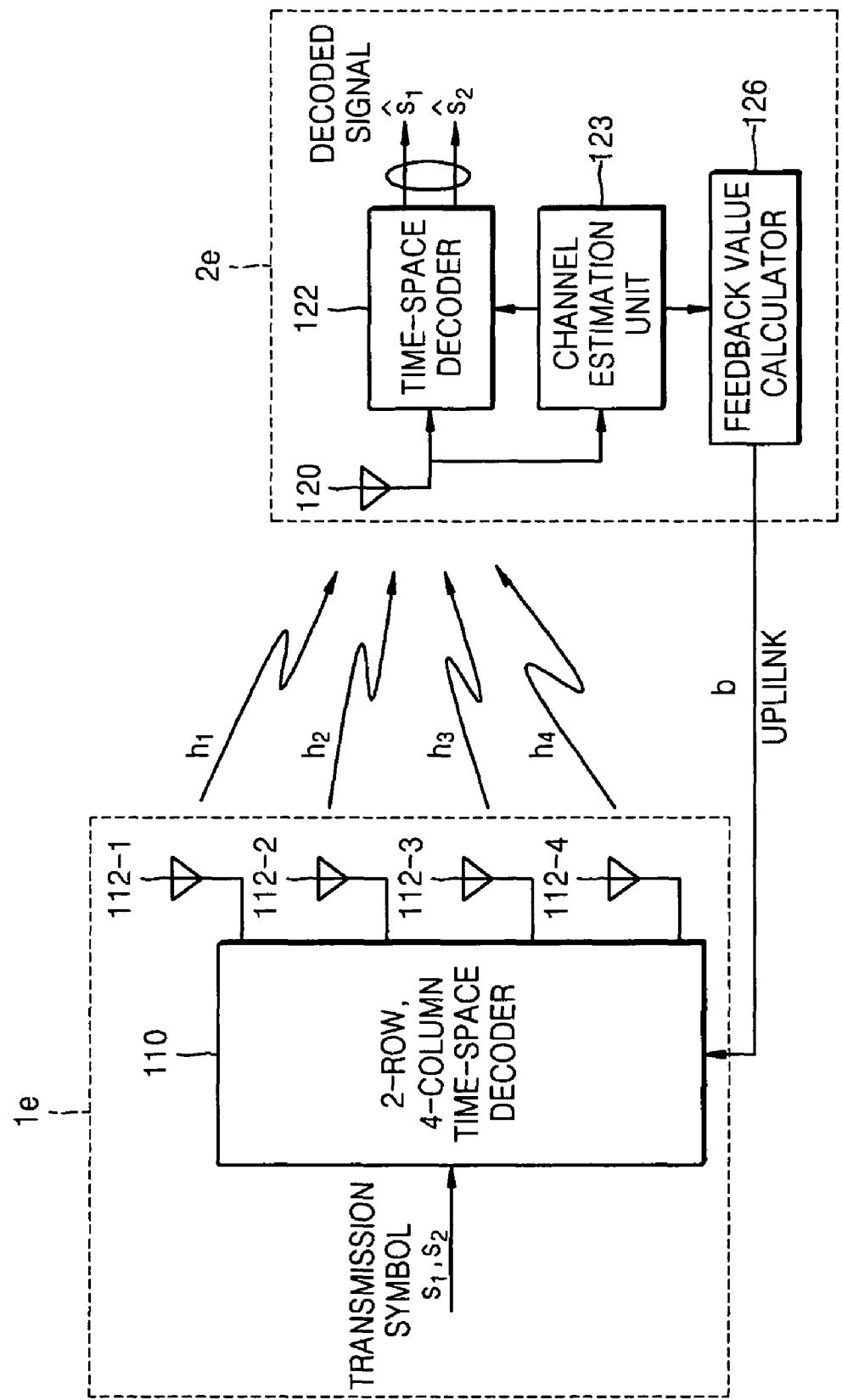
FIG. 2 is a block diagram of a conventional closed loop transmission diversity method that uses four transmission antennae.
Figure 3:
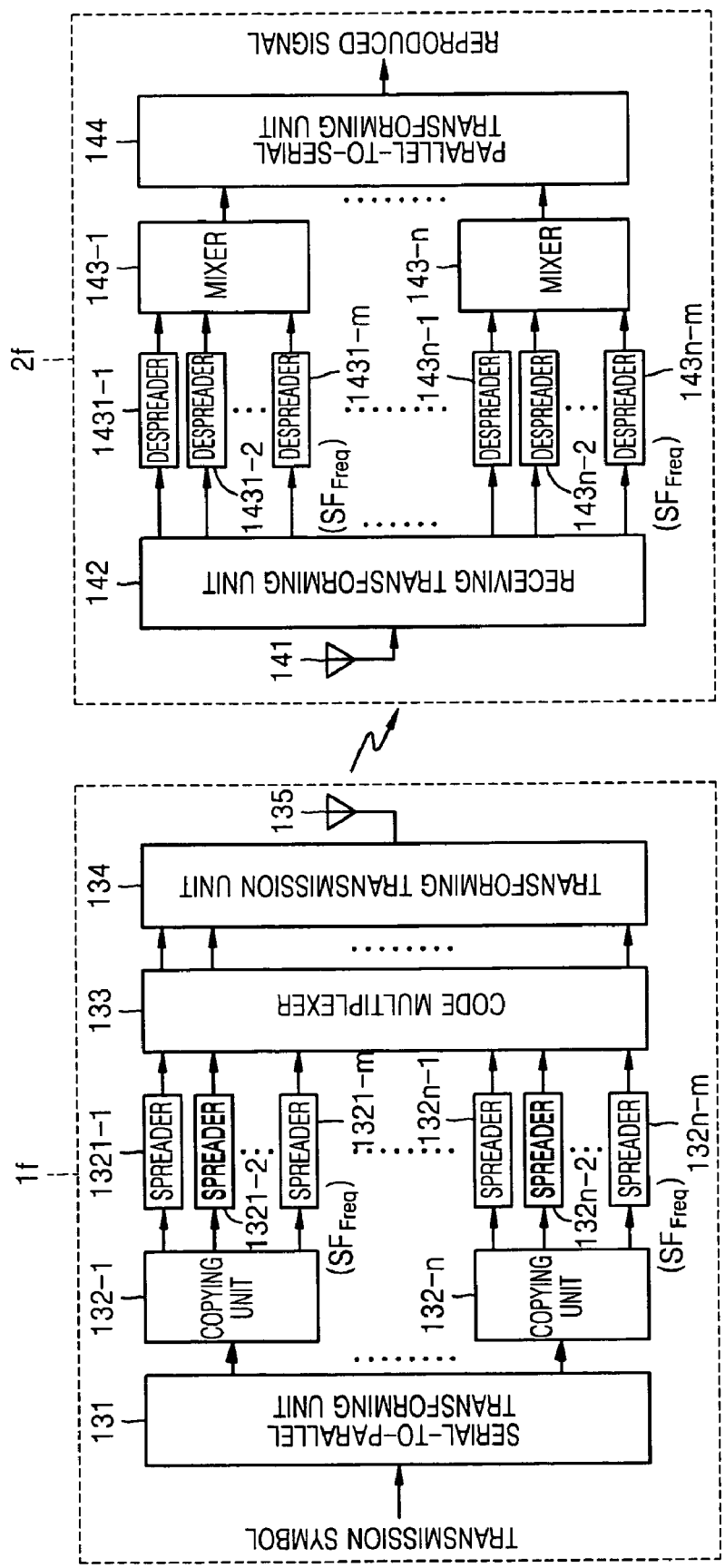
FIG. 3 is a block diagram of a conventional two-dimensional (2D) spreading Orthogonal Frequency Division Multiplexing-Code Division Multiplexing (OFDM-CDM) method.
Figure 4:
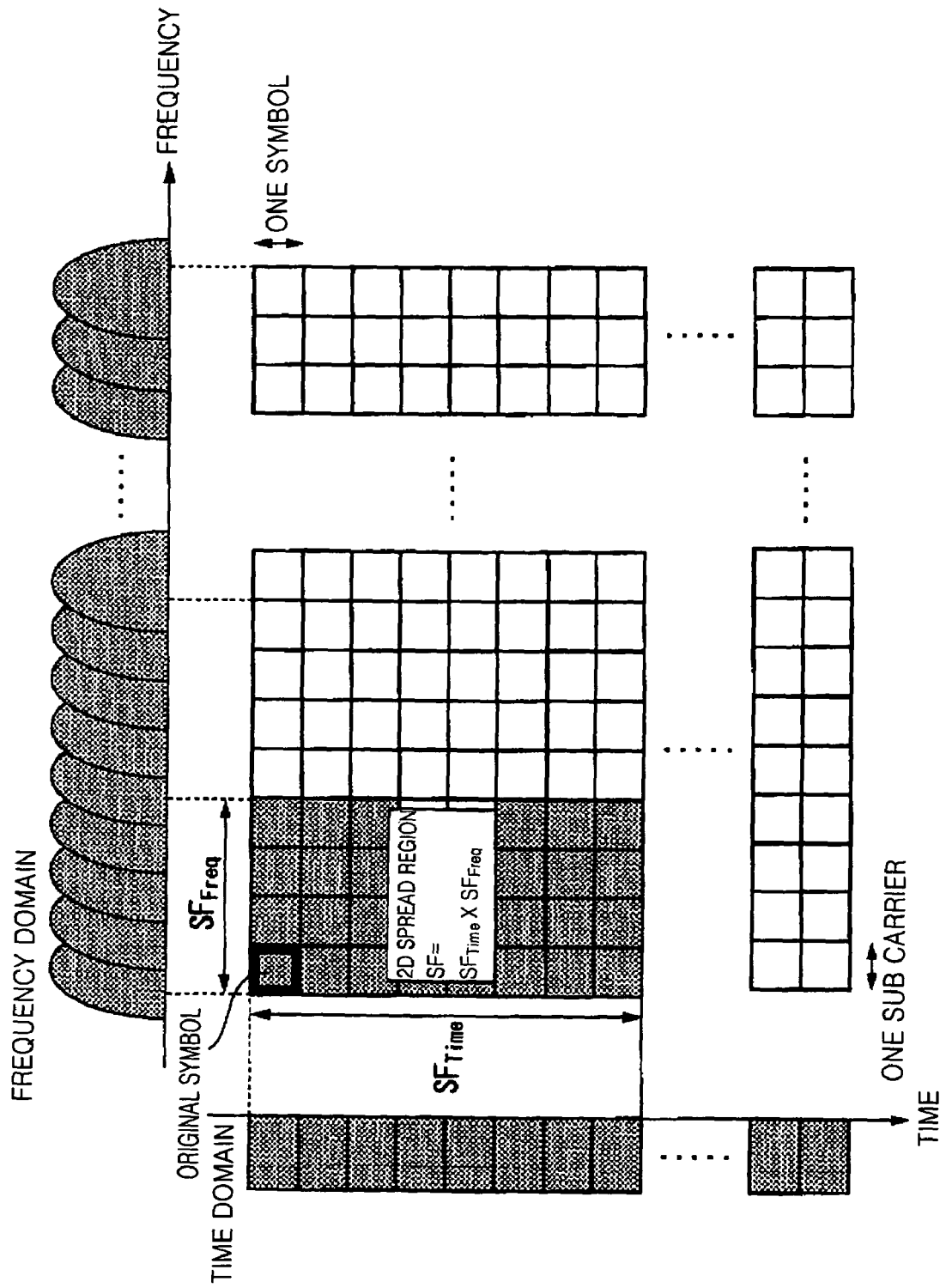
FIG. 4 is a conceptual diagram of the conventional 2D spreading OFDM-CDM method.
Figure 5:
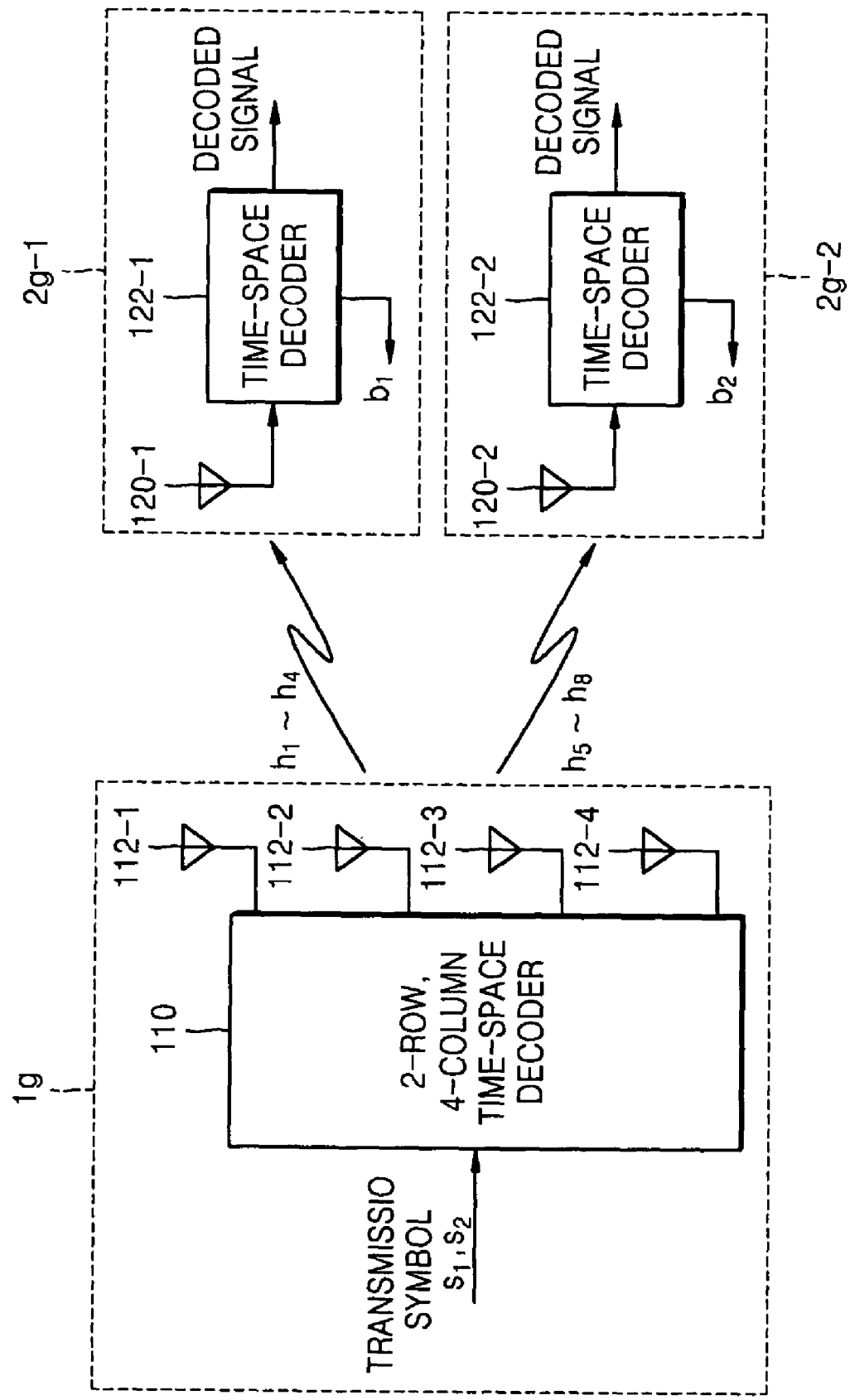
FIG. 5 is a block diagram illustrating a case where a plurality of receiving terminals are used when performing a conventional closed loop transmission diversity method that uses four transmission antennae.

To perform the OFDM-CDM method, the OFDM-CDM modulators 31-1 through 31-4 include constituent elements such as those of the radio transmitter 1f of FIG. 3. Specifically, each of the OFDM-CDM modulators 31-1 through 31-4 serial-to-parallel transforms received signals, two dimensionally spreads each of the transformed signals in the directions of frequency and time based on spreading code, performs IFFT on the 2D spread signal for each sub carrier, inserts a guard interval (GI) into the transformed signal to prevent an interference between codes, and transmits the transformed signal. According to another embodiment of the present invention, different spreading codes are input to the OFDM-CDM modulators 31-1 and 31-2, and the OFDM-CDM modulators 31-3 and 31-4. In this embodiment, spreading code #1 is input to the OFDM-CDM modulators 31-1 and 31-2 and spreading code #2 is input to the OFDM-CDM modulators 31-3 and 31-4, which will later be described in greater detail.

Figure 9:
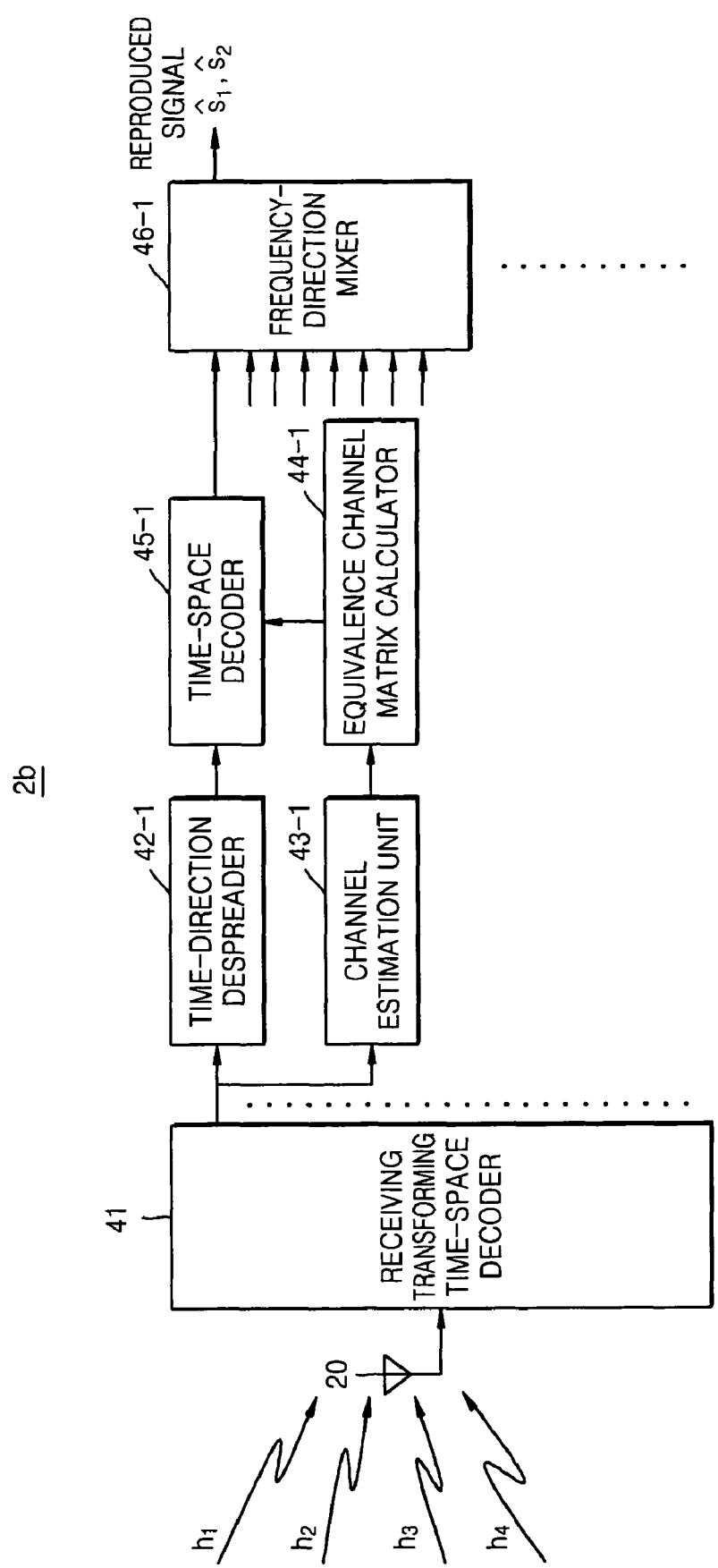
FIG. 9 is a block diagram of a radio receiver according to another embodiment of the present invention.

FIG. 9 is a block diagram of the radio receiver 2b of FIG. 8 that corresponds to the radio transmitter 1b of FIG. 8, according to an embodiment of the present invention. Referring to FIG. 9, a receiving transforming unit 41 removes the GI from the signal received via a receiving antenna 20, performs FFT on the received signal to transform it into a sub carrier, and outputs the sub carrier. A time-direction despreader 42-1 despreads the signal allocated to the sub carrier received from the receiving transformer 41 in the direction of time, based on predetermined spreading code. A channel estimation unit 43-1 respectively computes channel response estimated value $h_1\hat{}$, $h_2\hat{}$, $h_3\hat{}$, and $h_4\hat{}$ from sub carriers that are received via the receiving antenna 20 and transformed by the receiving transformer 41, at the frequencies of the sub carriers. An equivalence channel matrix calculator 44-1 computes an equivalence channel matrix at the frequencies of the sub carriers, based on the computed channel response estimated value $h_1\hat{}$, $h_2\hat{}$, $h_3\hat{}$, and $h_4\hat{}$. A time-space decoder 45-1 decodes the despread signal received from the time-direction despreader 42-1 based on the equivalence channel matrix received from the equivalence channel matrix calculator 44-1. A frequency-direction mixer 46-1 mixes the decoded signal received from the time-space decoder 45-1 and decoded signals received from time-space decoders corresponding to other sub carriers (not shown) in the direction of frequency, and outputs signal $S_1\hat{}$ and $s_2\hat{}$ that are to be reproduced.

Figure 10:
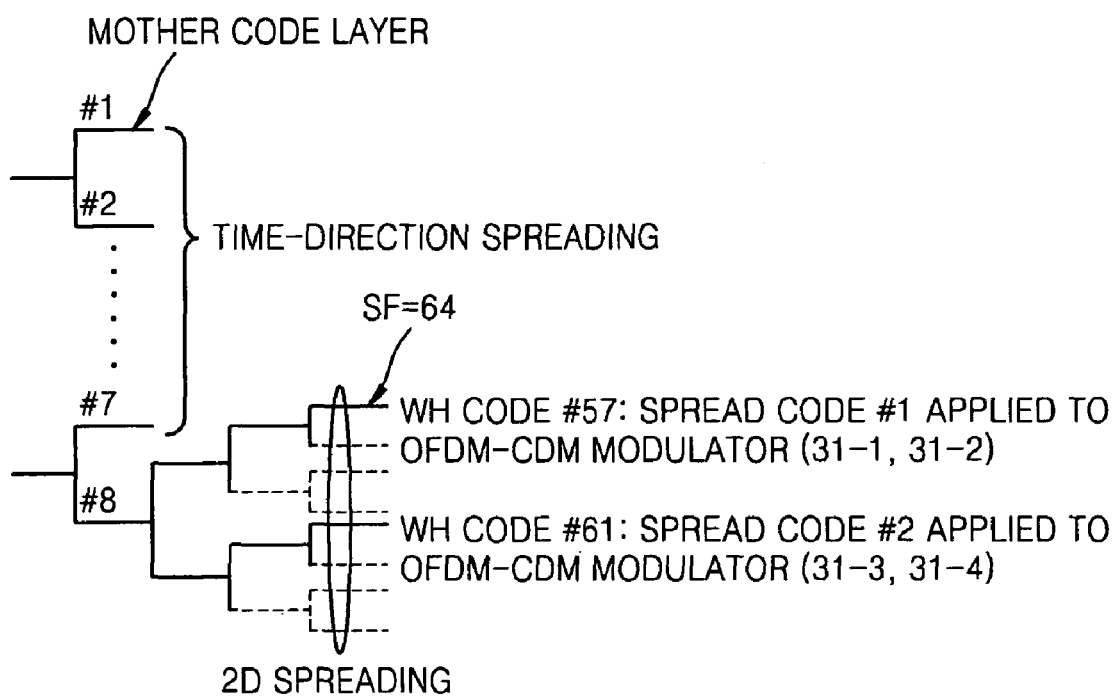
FIG. 10 is a diagram of a create tree of Walsh-Hadmard (WH) code and physical layer assignment, according to an embodiment of the present invention.

FIG. 10 is a diagram of a create tree of WH code input to the OFDM-CDM modulators 31-1 through 31-4 of the radio transmitter 1b, illustrated in FIGS. 8 and 9, according to the OFDM-CDM method, and physical layer assignment thereof, according to an embodiment of the present invention. As illustrated in FIG. 10, different spread codes, i.e., WH code #57 and WH code #61, are respectively input to the OFDM-CDM modulators 31-1 and 31-2, and the OFDM-CDM modulators 31-3 and 31-4.

The WH code #57 and the WH code #61 belong to the create tree of the same mother code layer, and the signs thereof are alternately equal and opposite in units of spreading lengths of 8, for example, as expressed in Equations (15) and (16). The reason why WH codes belonging to the create tree of the same mother code layer are used is not to reduce the number of WH codes to be used for time-direction spreading. That is, the codes of a mother code layer that are orthogonal signs must be used for time-direction spreading. If the WH codes #57 and #61 belong to create trees of different mother code layers, the other WH codes available of the mother code layers total six and the amount of data to be transmitted is limited. In an embodiment of the present invention, since the WH codes #57 and #61 belong to the create tree of a mother code layer #8 as illustrated in FIG. 10, the WH codes of seven mother code layers #1 through #7 are available for time-direction spreading, similarly to the prior art. That is, WH codes of the create tree of the same mother code layer are used to achieve the purpose of the present invention without reducing the amount of data to be transmitted.

Figure 11:
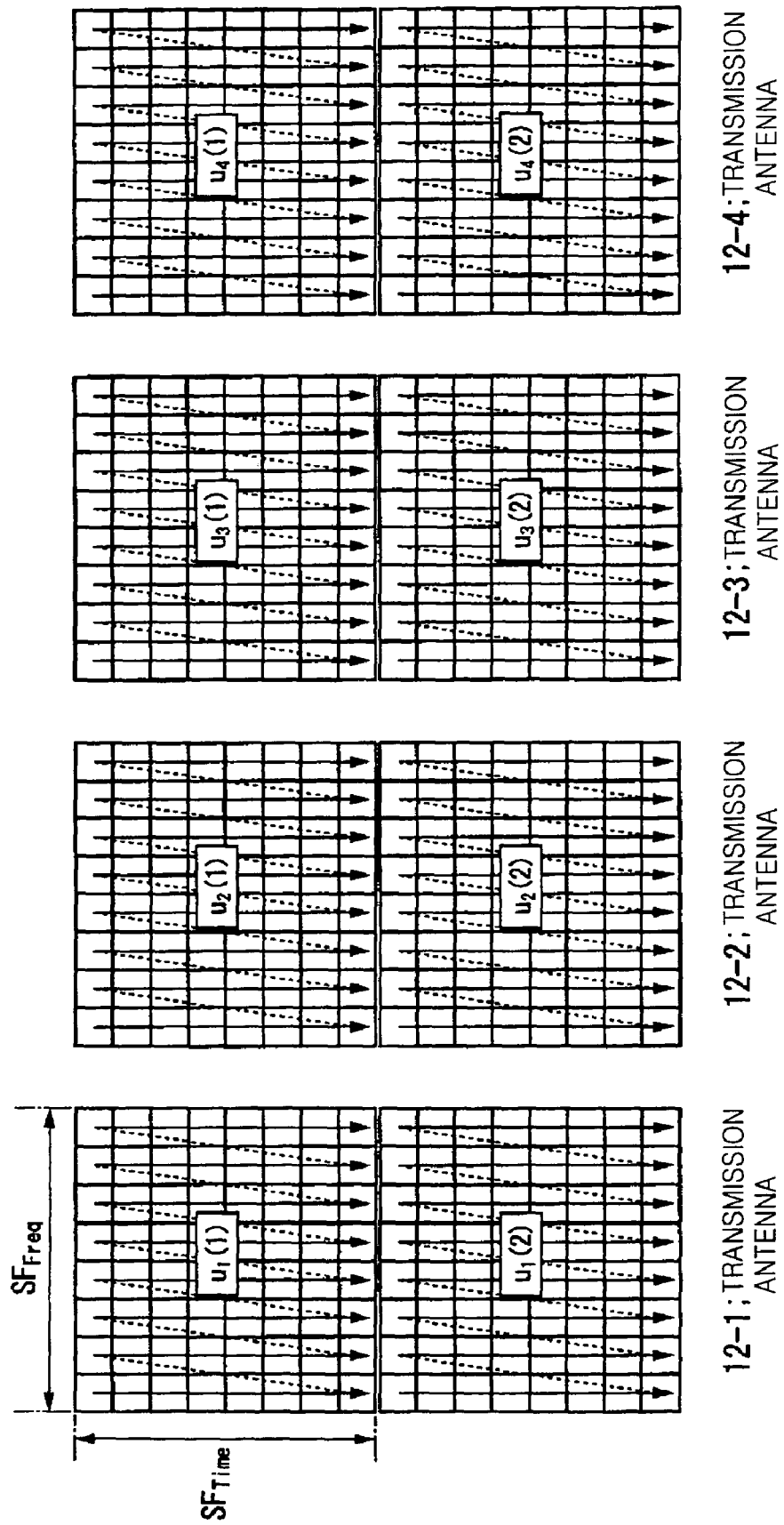
FIG. 11 is a diagram illustrating allocation of spread signals in a 2D spreading region according to an embodiment of the present invention.

FIG. 11 is a diagram illustrating allocation of a transmission symbol signal to a 2D spreading region of each of transmission antennae 12-1 through 12-4, according to an embodiment of the present invention. Spread first time-slot signals $u_1(1)$, $u_2(1)$, $u_3(1)$, and $u_4(1)$ may be respectively represented as $u_1(1)=s_1 \times w_{57}$, $u_2(1)=s_2 \times w_{57}$, $U_3(1)=s_1 \times w_{61}$, and $u_4(1)=s_2 \times w_6$, by using WH code. If the spreading lengths of WH codes $w_{57}$ and $w_{61}$ are 64, 64 spread symbols are repeatedly allocated to a 2D spreading region at each rate of time-direction spreading $SF_{Time}$. In this case, the frequencies of sub carriers allocated to the transmission antennas 12-1 through 12-4 are the same, and thus, the same sub carrier allocated with eight partial spread segments are transmitted for a block of frequency-direction spreading $SF_{Freq}$ of each of the first time-slot signals $u_1(1)$, $u_2(1)$, $u_3(1)$, and $u_4(1)$.

The operations of the radio transmitter 1b illustrated in FIG. 8 and the radio receiver 2b illustrated in FIG. 9 will now be described. The 2-row, 4-column time-space decoder 10 of the radio transmitter 1b transforms received transmission symbol signals $s_1$ and $s_2$ into the 2-row, 4-column matrix S expressed in Equation (14). The OFDM-CDM modulators 31-1 and 31-2 perform time-direction spreading based on WH code #57, and the OFDM-CDM modulators 31-3 and 31-4 perform time-direction spreading based on WH code #61. Further, the OFDM-CDM modulator 31-1 arrays the time-direction spread signal $u_1(1)=s_1 \times w_{57}$ in a 2D spreading region in a first time slot in the direction of time as illustrated in FIG. 11, and repeatedly performs signal array for neighboring sub carriers in the direction of time when the rate of time-direction spreading SFTime is greater than 8. The OFDM-CDM modulators 31-2 through 31-4 respectively allocate the spread signals $u_2(1)=s_2 \times w_{57}$, $u_3(1)=s_1 \times w_{61}$, and $u_4(1)=s_2 \times w_{61}$ to the 2D spreading regions, perform IFFT thereon to transform them into time-domain signals, insert a GI into the time-domain signals, and then, transmit the time-domain signals. Similarly, the spread signals $u_1(2)=-s_2^* \times w_{57}$, $u_2(2)=s_1 \times w_{57}$, $u_3(2)=-s_2^* \times w_{61}$, and $u_4(2)=s_1^* \times w_{61}$ are respectively allocated to 2D spreading regions in a second time slot, as illustrated in FIG. 11, and then transmitted.

The radio receiver 2*b* receives the signals from the radio transmitter 1*b*, and the receiving transforming unit 41 removes the GI from the signals and performs FFT thereon to transform them into sub carriers. The time-direction despreader 42-1 despreads sub carriers that contain partial spread segments corresponding to first eight symbols of the first sub carriers $u_1(1)$, $u_2(1)$, $u_3(1)$, and $u_4(1)$ in the direction of time, based on the sign of the WH code #57 used for spreading performed by the radio transmitter 1*b*. The time-space decoder 45-1 decodes the signals despread in the direction of time based on an equivalence channel matrix computed by the channel estimation unit 43-1 and the equivalence channel matrix calculator 44-1, and outputs the decoded signals. The frequency-direction mixer 46-1 mixes the decoded signals received from the time-space decoder 45-1 over the sub carriers in the 2D spreading region in the direction of frequency, and outputs signal $s_1\hat{}$ and $s_2\hat{}$ to be reproduced.

In another embodiment of the present invention, since the rate of partial dispreading performed by the time-direction despreader 42-1 is equal to the rate of time-direction spreading according to the 2D spreading OFDM-CDM method. Thus, the channel response values of neighboring sub carriers are the same, and the absolute array gains of adjacent sub carriers are almost the same but the signs thereof are opposite. Therefore, an array gain is denied since the decoded signals are mixed in the direction of frequency, but a space diversity gain is obtained according to an open loop transmission diversity method.

A total number of each of the time-direction despreader 42-1, the time-space decoder 45-1, the channel estimation unit 43-1, and the equivalence channel matrix calculator 44-1, illustrated in FIG. 9, is determined by the number of sub carriers. For example, as illustrated in FIG. 11, if $SF_{Freq}=8$, eight time-direction despreaders 42-1 are needed. The number of the frequency-direction mixers 46-1 is determined by the number of units in which the decoded signals are mixed in the direction of frequency. If $SF_{Freq}=8$, one frequency-direction mixer and eight time-space decoders are connected to an input side.

Figure 12:
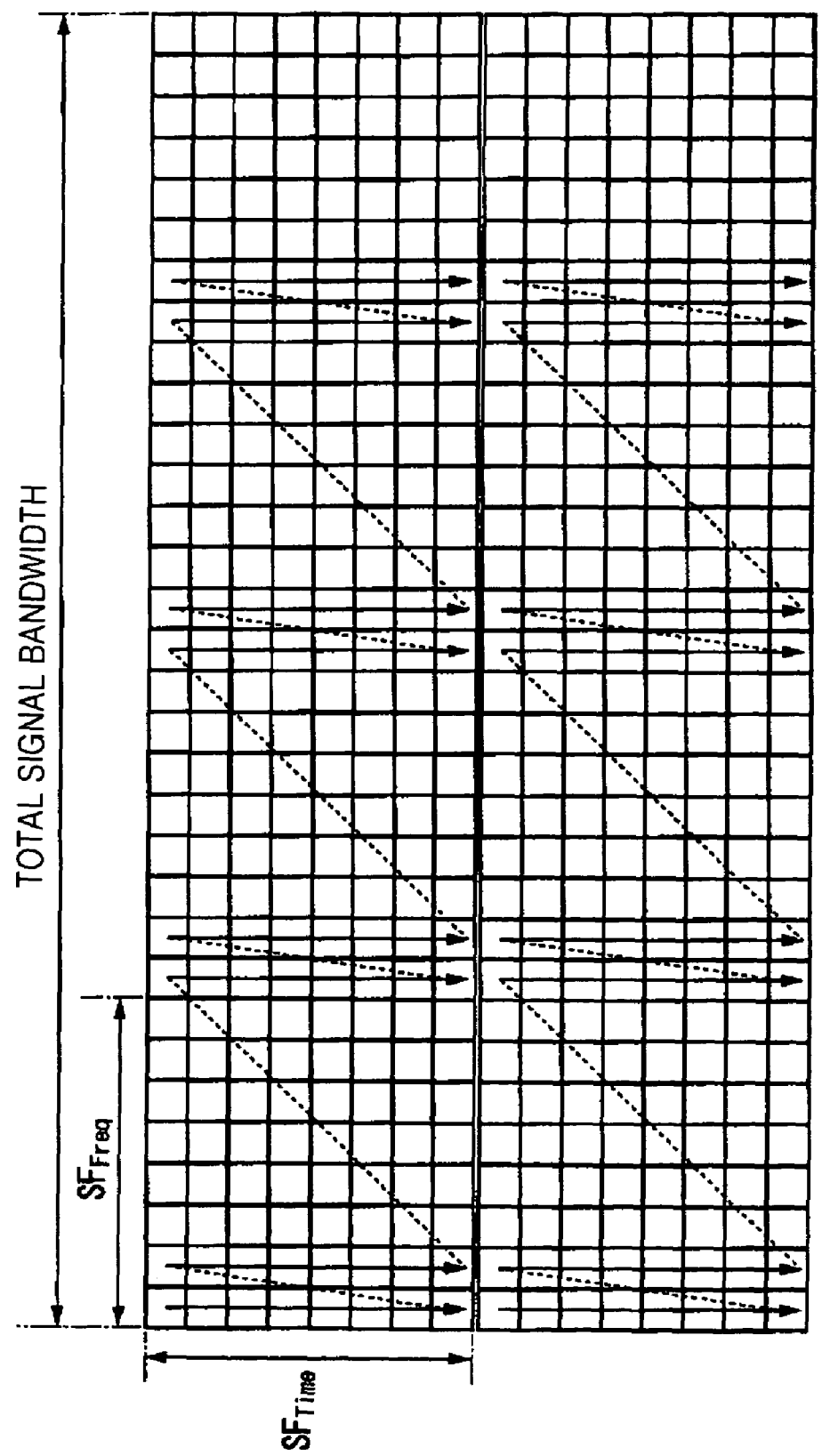
FIG. 12 is a diagram illustrating allocation of signals in a transmission antenna when chip interleaving is performed on the spreading chips of a spread signal, according to an embodiment of the present invention.

FIG. 12 is a diagram illustrating allocation of signals in a transmission antenna when chip interleaving is performed on the symbols of a spread signal, i.e., spreading chips. As illustrated in FIG. 12, chip interleaving indicates arrangement of the signals in a frequency domain so that they are widely spread therein by allocating the spreading chips to the sub carriers spaced apart from one another at specific intervals of frequency, e.g., $SF_{Freq}$, which correspond to predetermined frequencies described in the claims of the present invention.

Since the signs of WH codes are alternately equal and opposite in units of $SF_{Time}$, interleaving must be performed on every two adjacent sub carriers. If a receiving side deinterleaves the interleaved spreading chips, array gains of two adjacent sub carriers are the same but the signs thereof are opposite, thereby denying the array gains. Also, while signals are mixed in the direction of frequency, even if the level of power for receiving sub carriers over adjacent sub carriers is low, it is possible to disperse the influence caused by the low-level power when a pair of sub carriers that are spaced from each other are combined. That is, a frequency diversity gain is obtained by performing chip interleaving.

Next, a radio transmitter and a radio receiver for the 2D spreading OFDM-CDM method, according to another embodiment of the present invention, will be described with reference to FIGS. 13 through 15.

Figure 13:
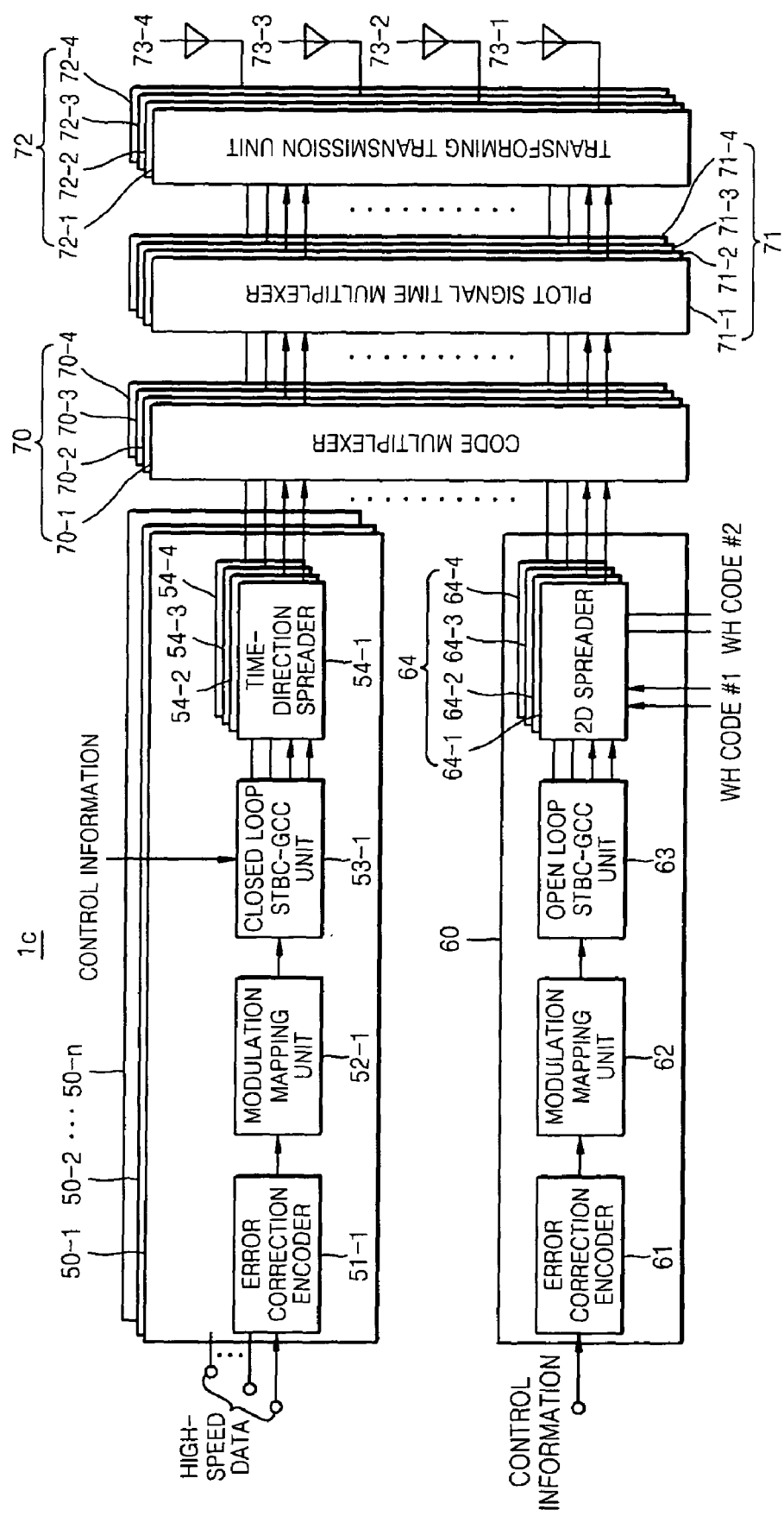
FIG. 13 is a block diagram of a radio transmitter according to another embodiment of the present invention.

FIG. 13 is a block diagram of a radio transmitter 1*c* according to another embodiment of the present invention. The radio transmitter 1*c* is capable of individually setting control information for high-speed data for changing control information for each user's terminal, i.e., data for information transmitted to or received from each user's terminal. Thus, the radio transmitter 1*c* transmits data according to the conventional closed loop STBC-GCC method. However, the radio transmitter 1*c* is not capable of individually setting control data specifying a method of modulating common data to be transmitted to all of user's terminals, and thus transmits the control data according to the open loop STBC-GCC method according to the present invention.

Referring to FIG. 13, the radio transmitter 1*c* includes a plurality of high-speed data channels 50-1 through 50-*n* and a control data channel 60. For instance, the high-speed data channels 50-1 through 50-*n* are installed to respectively correspond to separate radio receivers. Since the constructions of the high-speed data channels 50-1 through 50-*n* are the same, only the construction of the high-speed data channel 50-1 will be described here. In the high-speed data channel 50-1, an error correction encoder 51-1 allocates error correction code to received transmission data. A modulation-mapping unit 52-1 generates symbols by mapping the transmission signal received from the error correction encoder 51-1 to a modulated signal according to a Quadrature Phase Shift Keying (QPSK) method, for example. A closed loop STBC-GCC encoder 53-1 performs 2-rows, 4-column STBC based on a feedback of a control value received from a receiving side. Time-direction spreading units 54-1 through 54-4 generates a spread signal by spreading four symbols received from the closed loop STBC-GCC encoder 53-1 in the direction of time, based on a predetermined spreading code.

In a control data channel 60, an error correction encoder 61 allocates error correction code to received control data. A modulation-mapping unit 62 generates symbols by mapping the control data received from the error correction encoder 61 to a modulated signal according to the Quadrature Phase Shift Keying (QPSK) method, for example. An open loop STBC-GCC encoder 63 performs 2-row, 4-column STBC without a feedback of a control value received from a receiving side. 2D spreading units 64-1 through 64-4 generates a spread signal by spreading the symbols in the direction of time, based on predetermined spreading code.

Code multiplexers 70-1 through 70-4 are installed to respectively correspond to transmission antennae 73-1 through 74-4 and be connected to the time-direction spreaders 54-1 through 54-4 and the 2D spreaders 64-1 through 64-4. The code multiplexers 70-1 through 70-4 code-multiplexes the time-direction spread high-speed data received from the corresponding time-direction spreaders 54-1 through 54-4, and the 2D spread control data received from the 2D spreaders 64-1 through 64-4 on a spreading code axis.

Pilot signal time multiplexers 71-1 through 71-4 are respectively connected to the code multiplexers 70-1 through 70-4, and time-multiplex pilot signals with respect to code-multiplexed transmission frames received from the code multiplexers 70-1 through 70-4 in the direction of a time axis.

Transforming transmission units 72-1 through 72-4 are connected to the corresponding signal time multiplexers 71-1 through 71-4 and the corresponding transmission antennae 73-1 through 73-4. The transforming transmission units 72-1 through 72-4 perform IFFT on the transmission frames received from the signal time multiplexers 71-1 through 71-4 so as to transform them into time-domain signals, insert a GI into the time-domain signals to prevent an interference between codes, and transmit the time-domain signals via the corresponding transmission antennae 73-1 through 74-4.

Figure 14:
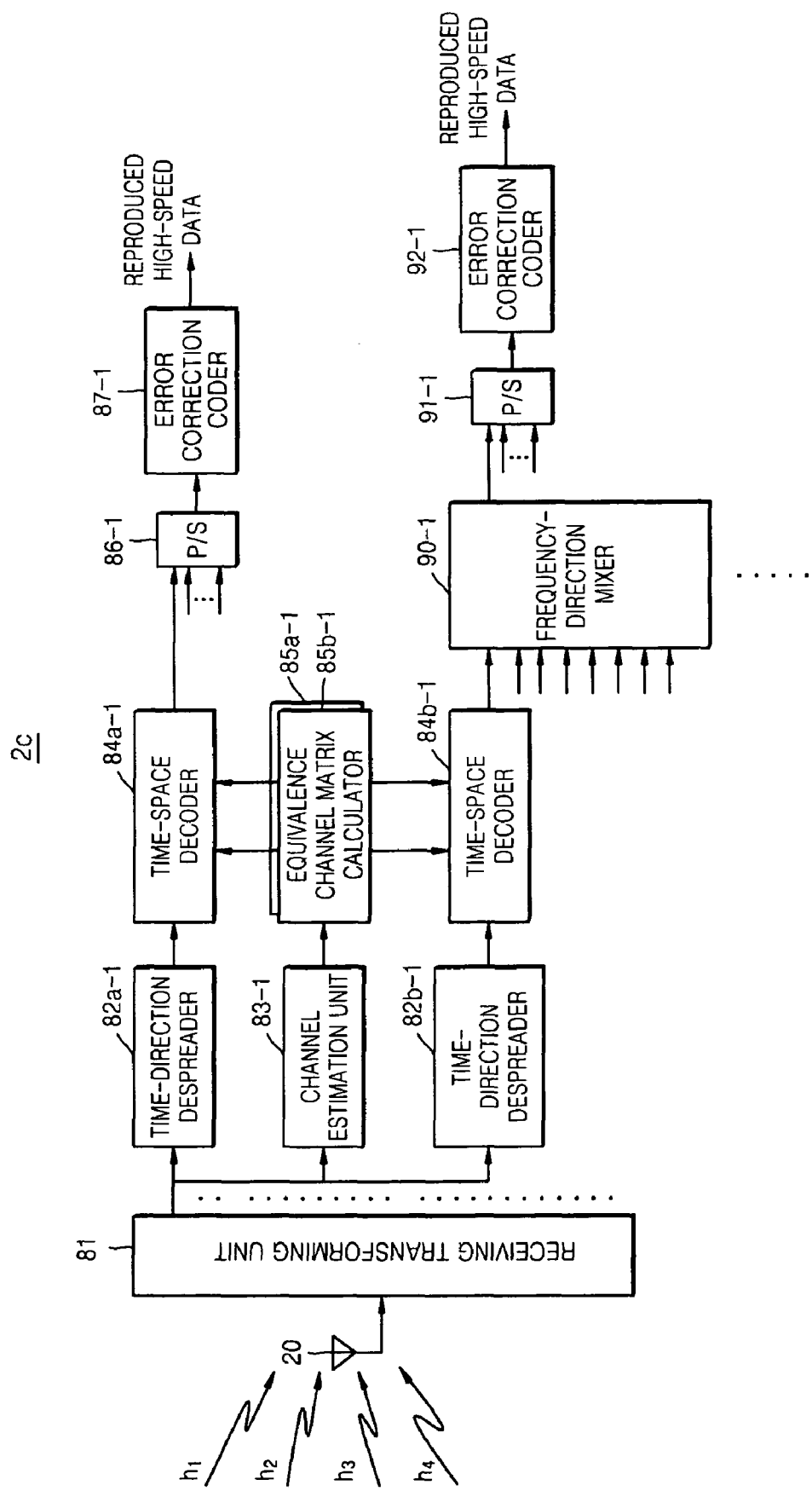
FIG. 14 is a block diagram of a radio receiver according to another embodiment of the present invention.

FIG. 14 is a block diagram of a radio receiver 2*c*, which corresponds to the radio transmitter 1*c* illustrated in FIG. 13, according to an embodiment of the present invention. Referring to FIG. 14, a receiving transforming unit 81 removes a GI from signals received via a receiving antenna 20, performs FFT thereon to transform the signals into sub carriers, and outputs the sub carriers. A first time-direction despreader 82a-1 despreads spread signals allocated to the sub carriers received from the receiving transforming unit 81 in the direction of time, based on spreading code obtained by spreading high-speed data in the direction of time. A second time-direction despreader 82b-1 despreads the spread signals allocated to the sub carriers received from the receiving transforming unit 81 in the direction of time, based on spreading code obtained by spreading control data in the direction of time.

A channel estimation unit 83-1 computes channel response estimated values $h_1\hat{}$, $h_2\hat{}$, $h_3\hat{}$, and $h_4\hat{}$ from pilot signals contained in the sub carriers received from the receiving transforming unit 81, at the frequency of the sub carrier, and outputs them. A first equivalence channel matrix calculator 85a-1 computes an equivalence channel matrix corresponding to a high-speed data channel. A second equivalence channel matrix calculator 85b-1 computes an equivalence channel matrix corresponding to a control data channel.

A first time-space decoder 84a-1 decodes the signals that contain the high-speed data despread in the direction of time, received from the time-direction despreader 82a-1, based on the equivalence channel matrix received from equivalence channel matrix calculator 85a-1. A second time-space decoder 84b-1 decodes the signals that contain the control data despread in the direction of time, received from the time-direction despreader 82b-1, based on the equivalence channel matrix received from the equivalence channel matrix calculator 85b-1.

A first parallel-to-serial (P/S) transformer 86-1 parallel-to-serial transforms the signals from the first time-space decoder 84a-1 and signals, received from other time-space decoders, which are obtained by decoding signals that contain the high-speed data from other sub carriers; and outputs high-speed data having the error correction code. A first error correction decoder 87-1 performs error correction decoding on the high-speed data from the parallel-to-serial transformer 86-1, and reproduces the high-speed data.

A frequency-direction mixer 90-1 mixes the signals containing the control data from the second time-space decoder 84b-1, and other time-space decoders that perform decoding for other sub carriers. A second P/S transformer 91-1 parallel-to-serial transforms the signals from the second time-space decoder 84b-1, and other time-space decoders performing decoding for other sub carriers, and outputs control data containing error correction code. A second error correction decoder 92-1 performs error correction decoding on the control data from the P/S transformer 91-1, and reproduces the control data.

A total number of each of the first and second time-direction despreaders 82a-1 and 82b-1, the first and second time-space decoders 84a-1 and 84b-2, the channel estimation unit 83-1, and the first and second equivalence channel matrix calculators 85a-1 and 85b-1 is determined by the number of sub carriers. Also, the signals from the second time-space decoder 84b-1 are supplied to the frequency-direction mixer 90-1, the number of signals being equal to the number of spreading lengths in the direction of frequency in 2D spreading, and the signals being despread in the direction of time. Since the first and second P/S transformers 86-1 and 91-1 reproduce the original data, the number of signals supplied to the first and second P/S transformers 86-1 and 91-1 is equal to the number of parallel data obtained by serial-to-parallel transforming the signals received from the radio transmitter 1c.

Figure 15:
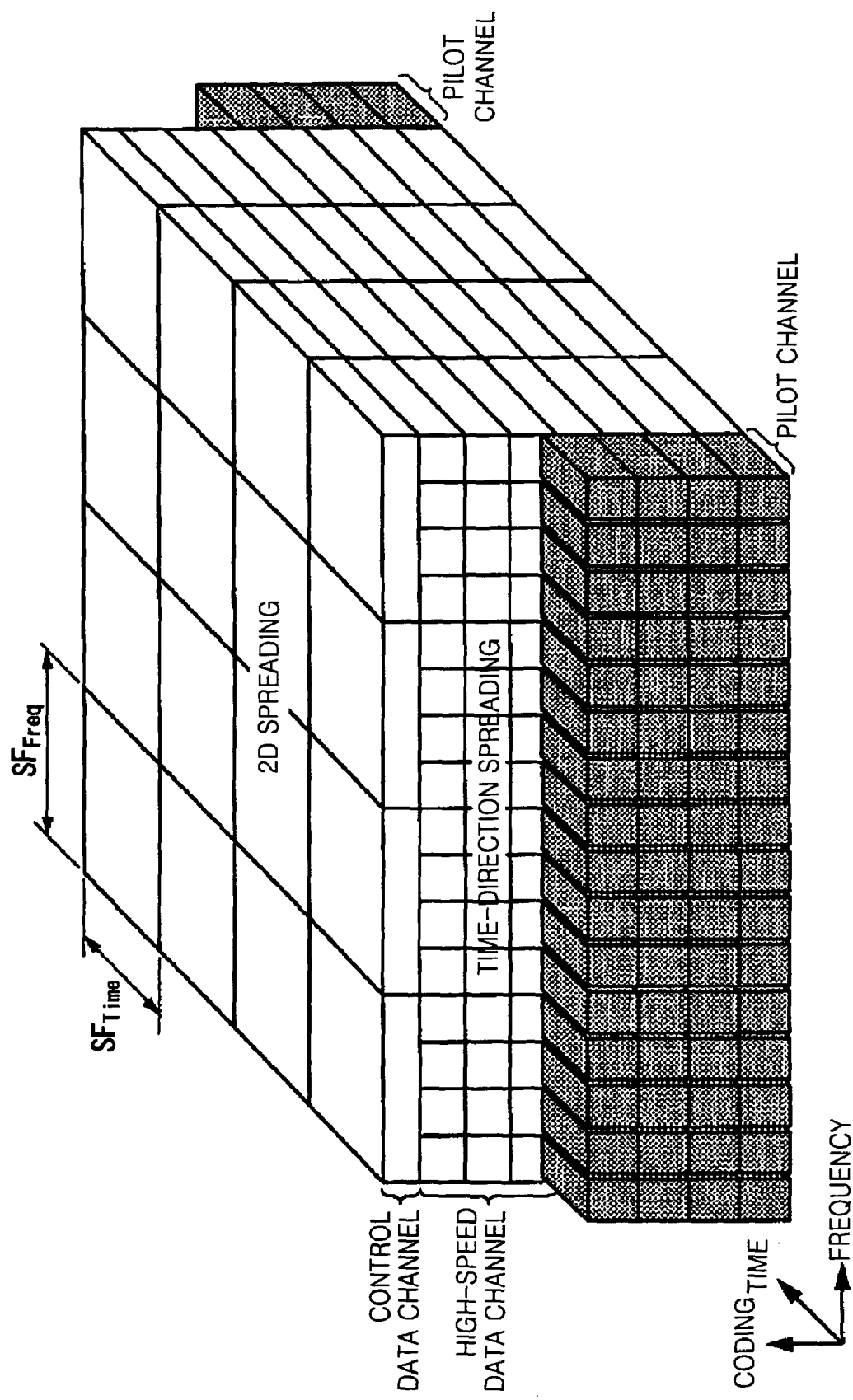
FIG. 15 is a diagram of a transmission frame according to an embodiment of the present invention.

FIG. 15 is a diagram of a transmission frame received from the radio transmitter 1c of FIG. 13, according to an embodiment of the present invention. Referring to FIG. 15, transmission data and control data are code-multiplexed, and a pilot signal is time-multiplexed with respect to the control data and the transmission data and allocated to a time slot different from the time slots of the control data and high-speed data.

Now, the operations of the radio transmitter 1c of FIG. 13 and the radio receiver 2c of FIG. 14 will be described. When high-speed data is supplied to the radio transmitter 1c, corresponding control data is supplied to the radio transmitter 1c. The received high-speed data is error-correction coded by the error correction encoder 51-1 and mapped to a modulated signal by the modulation mapping unit 52-1, thus generating transmission symbol signals. The closed loop STBC-GCC encoder 53-1 performs 2-row, 4-column STBC expressed in Equation (6) on the transmission symbol signals, based on the control information from the radio receiver 2c. The time-space coded transmission symbol signals are spread by the time-direction spreaders 54-1 through 54-4, and allocated to time-direction spread segments.

The received control data is error correction coded by the error correction encoder 61 and mapped to a modulated signal by the modulation mapping unit 62, thus obtaining transmission symbol signals. The open loop STBC-GCC encoder 63 performs 2-row, 4-column STBC expressed in Equation (14) on the transmission symbol signals. The time-space coded transmission symbol signals are spread in the direction of time by the 2D spreaders 64-1 through 64-4, and allocated to 2D spread segments while performing chip interleaving for each of two sub carriers. Also, spread codes are supplied to the 2D spreading units 64-1 through 64-4. Specifically, WH code #1 and WH code #2 are respectively supplied to the 2D spreading units 64-1 and 64-2, and the 2D spreading units 64-3 and 64-4. WH codes #1 and #2 may be $w_{57}$ expressed in Equation (15) and $w_{61}$ expressed in Equation (16).

Next, the spread signals output from the time-direction spreaders 54-1 through 54-4 and the spread signals output from the 2D spreaders 64-1 through 64-4 are multiplexed by the code multiplexers 70-1 through 70-4 on a spreading code axis, and pilot signals are time-multiplexed by the pilot signal time multiplexers 71-1 through 71-4, thereby obtaining transmission frames such as shown in FIG. 15. The transforming transmission units 72-1 through 72-4 perform IFFT on the obtained transmission frames to transform them into time-domain signals and insert a GI into the time-domain signals to prevent an interference between codes. The time-domain signals are transmitted via the transmission antennae 73-1 through 73-4.

In the radio receiver 2c, the receiving transforming unit 81 removes the GI from the time-domain signals and performs FFT thereon to transform them into sub carriers. Next, a plurality of the channel estimation units 83-1 corresponding to the sub carriers compute channel response estimated values of the sub carriers from the time-multiplexed pilot signals (FIG. 14 illustrates only the channel estimation unit 83-1 for convenience, but the number of the channel estimation unit 83-1 is determined by the number of the sub carriers). The first and second equivalence channel matrix calculators 85a-1 and 85b-1 compute equivalence channel matrices based on the computed channel response estimated values.

The first equivalence channel matrix calculator 85a-1 related to the high-speed data computes the equivalence channel matrix based on the control data received from the radio transmitter 1c. The equivalence channel matrix calculator 85b-1 related to the control data computes the equivalence channel matrix by using a formula of computing an equivalence channel matrix for even-numbered sub carriers and a formula of computing an equivalence channel matrix for odd-numbered sub carriers.

Next, the time-space decoder 84*a*-1 performs time-space decoding on the high-speed data based on the equivalence channel matrix computed by the equivalence channel matrix calculator 85*a*-1, and the time-space decoder 84*b*-1 performs time-space decoding on the control data based on the equivalence channel matrix computed by the equivalence channel matrix calculator 85*b*-1.

Then, the high-speed data from the time-space decoder 84*a*-1, and high-speed data being time-space decoded from other sub carriers, are transformed into serial data by the P/S transformer 86-1. The first error correction decoder 87-1 generates high-speed data by error-correction coding the serial data.

The control data from the time-space decoder 84*b*-1, and control data time-space decoded from other sub carriers are deinterleaved over a 2D spreading region. The deinterleaved control data are mixed by the frequency-direction mixer 90-1 in the direction of frequency. The P/S transformer 91-1 transforms the mixing result and data decoded from other spread segments into serial data, and the second error correction decoder 92-1 error correction decodes the serial data and outputs the error correction decoded control data.

In the transmission diversity method that uses four transmission antenna branches, according to another embodiment of the present invention, a transmitting side does not need common control data from a plurality of radio receivers, thereby obtaining a space diversity gain. Further, chip interleaving is performed to obtain a frequency diversity gain, thereby improving communication quality.

In the above embodiments of the present invention, WH codes that are orthogonal codes are used. However, if codes are orthogonal to each other, the type of the codes is not limited. For example, orthogonal, complementary codes may be used. Further, semi-orthogonal codes may be applied to the preset invention.

An encoder, a spreading unit, a transforming unit, and a transmitter of a radio transmitter that are recited in the claims of the present invention correspond to those described in the above embodiments of the present invention. Specifically, according to an embodiment of the present invention, the encoder corresponds to the 2-row, 4-column time-space decoder 10, and the spreading unit and the transmitter correspond to the spreading units 11-1 through 11-4. According to another embodiment of the present invention, the encoder corresponds to the 2-row, 4-column time-space decoder 10, and the spreading unit, the transforming unit, and the transmitter correspond to the OFDM-CDM modulators 31-1 through 31-4. According to another embodiment of the present invention, the encoder corresponds to the open loop STBC-GCC unit 63, the spreading unit corresponds to the 2D spreading units 64-1 through 64-4, and the transforming unit corresponds to the transforming transmission 72-1 through 72-4.

A receiver, a transforming unit, a decoder, and a mixer of a radio receiver that are recited in the claims of the present invention, correspond to those in the above embodiments of the present invention. Specifically, according to an embodiment of the present invention, the receiver corresponds to the partial despreader 21, the decoder corresponds to the time-space decoder 22, and the mixer corresponds to the mixer 25. According to another embodiment of the present invention, the receiver and the transforming unit correspond to the receiving transforming unit 41, the decoder corresponds to the time-space decoder 45-1, and the mixer corresponds to the frequency-direction mixer 46-1. According to another embodiment of the present invention, the receiver and the transforming unit correspond to the receiving transforming unit 41, the decoder corresponds to the time-space decoder 84*b*-1, and the mixer corresponds to the frequency-direction mixer 90-1.

A computer system may be included in the radio transmitters 1*a*, 1*b*, and 1*c* and the radio receivers 2*a*, 2*b*, and 2*c*. In the above embodiments of the present invention, the processes of coding, spreading, and transforming transmission data and received data, which are performed in the radio transmitters 1*a*, 1*b*, and 1*c* and the radio receivers 2*a*, 2*b*, and 2*c*, may be recorded in a computer readable medium in the form of a program. If the program is read and executed by a computer, the processes are performed. The computer readable medium may be a magnetic disk, a magneto-optical disc, a CD-ROM, a DVD-ROM, a semiconductor memory, or the like. The program may be transmitted to a computer via a communication line so that the computer can execute the program.

As described above, the present invention provides a radio transmitter that transmits data without a feedback of control information from a radio receiver according to the STBC-GCC method; and a radio receiver, a radio transmission method, a radio receiving method, a transmitting and receiving method, and a recording medium thereof that can accomplish a STBC-GCC-based OFDM-CDM method.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A radio transmission method comprising:
    (a) coding transmission data to a plurality of time-space codes;
    (b) generating spread signals by respectively mapping a plurality of spread codes and the time-space codes, each of the spread codes containing a combination of codes whose signs are alternately equal and opposite for each of spread codes corresponding to different groups of a plurality of transmission antennae; and
    (c) transmitting the spread signals via the corresponding groups of the transmission antennae,
    wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

2. The radio transmission method of claim 1, further comprising:
    (d) transforming a plurality of sub carriers having different frequencies into time-domain signals by performing inverse fast Fourier transform (IFFT) on the sub carriers; and
    (e) respectively allocating the spread signals to the sub carriers in units of specific spreading lengths,
    wherein during (c), the time-domain signals are transmitted via the transmission antennae.

3. The radio transmission method of claim 2, wherein during (e), when respectively allocating the spread signals to the sub carriers in the units of the specific spreading lengths, allocating of the spread signals to two sub carriers having adjacent frequencies, and then repeatedly allocating the spread signals to sub carriers spaced apart from one another at predetermined frequency intervals.

4. A radio transmission apparatus comprising:
an encoder coding transmission data into a plurality of time-space codes;
a spreader generating a plurality of spread signals by extracting a plurality of combinations of codes from the time-space codes and spreading the time-space codes by mapping a plurality of spread codes and each pair of the extracted time-space codes, each of the spread codes containing a combination of codes whose signals are alternately equal and opposite in units of specific spreading lengths for each of spread codes corresponding to different groups of a plurality of transmission antennae; and
a transmitter transmitting the generated spread signals via the corresponding groups of the transmission antennae,
wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

5. The radio transmission apparatus of claim 4, further comprising a transforming unit transforming a plurality of sub carriers having different frequencies into time-domain signals by performing inverse fast Fourier transform on the sub carriers, and transmitting the time-domain signals to the transmitter,
wherein the spreader respectively allocates the spread signals to the sub carriers in the units of the specific spreading lengths, and
the transmitter transmits the time-domain signals from the transforming unit via the transmission antennae.

6. The radio transmission apparatus of claim 5, wherein when respectively allocating the spread signals to the sub carriers in the units of the specific spreading lengths, the spreader repeatedly allocates the spread signals to two sub carriers having adjacent frequencies and then allocates the spread signals to sub carriers that are spaced apart from one another at predetermined frequency intervals.

7. A non-transitory computer readable medium having embodied thereon a program for executing a radio transmission method, the method comprising:
coding transmission data transmission data to a plurality of time-space codes;
generating spread signals by respectively mapping a plurality of spread codes and the time-space codes, each of the spread codes containing a combination of codes whose signs are alternately equal and opposite for each of spread codes corresponding to different groups of a plurality of transmission antennae; and
transmitting the spread signals via the corresponding groups of the transmission antennae,
wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

8. A radio reception method comprising:
(a) receiving signals transmitted via a plurality of transmission antennae;
(b) restoring time-space codes by despreading spread signals contained in the signals, based on one of a plurality of spread codes, each containing a combination of codes whose codes are alternately equal and opposite for each of spread codes corresponding to different groups of the transmission antennae; and
(c) decoding the restored time-space codes,
wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

9. The radio reception method of claim 8, further comprising:
(d) performing fast Fourier transform on the received signals and reading sub carriers having different frequencies; and
(e) reproducing data by mixing the decoded time-space codes in a direction of the frequencies of the sub carriers.

10. The radio reception method of claim 9, wherein during (e), when mixing the decoded time-space codes in the direction of the frequencies of the sub carriers, the data is reproduced by mixing two of the time-space codes, which correspond to a direction of adjacent frequencies, at predetermined frequency intervals.

11. A radio reception apparatus comprising:
a receiver receiving signals transmitted via a plurality of transmission antennae and outputting spread signals contained in the signals;
a despreader restoring time-space codes by despreading the spread signals from the receiver in units of specific spreading lengths, based on one of a plurality of spread codes, each containing a combination of codes whose signs are alternately equal and opposite in the units of the spreading lengths for each of spread codes corresponding to different groups of the transmission antennae;
a decoder decoding the restored time-space codes; and
a mixer reproducing data by mixing the decoded time-space codes,
wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

12. The radio reception apparatus of claim 11, further comprising a transforming unit performing fast Fourier transform on the signals received from the receiver, reading sub carriers having different frequencies, and outputting the spread signals allocated to the sub carriers, wherein the mixer reproduces the data by mixing the time-space codes decoded by the decoder in a direction of the frequencies of the sub carriers.

13. The radio reception apparatus of claim 12, wherein, when mixing the decoded time-space codes in the direction of the frequencies of the sub carriers, the mixer reproduces the data by mixing two of the time-space codes, which correspond to a direction of adjacent frequencies, at predetermined frequency intervals.

14. A non-transitory computer readable medium having embodied thereon a program for executing a radio reception method, the method comprising:
   receiving signals transmitted via a plurality of transmission antennae;
   restoring time-space codes by despreading spread signals contained in the signals, based on one of a plurality of spread codes, each containing a combination of codes whose signs are alternately equal and opposite for each of spread codes corresponding to different groups of the transmission antennae; and
   decoding the restored time-space codes,
   wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

15. A transmitting and receiving method performed in a radio communication system which comprises a radio transmitter transmitting signals via a plurality of transmission antennae and a radio receiver receiving the signals from the radio transmitter, the method comprising:
   the radio transmitter coding the signals into a plurality of time-space codes;
   the radio transmitter extracting a plurality of combinations of codes from the coded time-space codes;
   the radio transmitter generating spread signals by spreading the time-space codes by mapping a plurality of spread codes and each pair of the time-space codes, each of the spread codes containing a combination of codes whose signs are alternately equal and opposite in units of specific spreading lengths for each of spread codes corresponding to different groups of a plurality of transmission antennae;
   the radio transmitter transmitting the generated spread signals via the corresponding groups of the transmission antennae;
   the radio receiver receiving signals transmitted via the transmission antennae and outputting the spread signals contained in the received signals;
   the radio receiver restoring the time-space codes by despreading the spread signals in units of the specific spreading lengths, based on one of a plurality of spreading codes, each containing a combination of codes whose signs are alternately equal and opposite in the units of the specific spreading lengths;
   the radio receiver decoding the restored time-space codes; and
   the radio receiver reproducing data by mixing the decoded time-space codes,
   wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

16. A non-transitory computer readable medium having embodied thereon a computer program for making a computer of a radio transmitter, which transmits signals via a plurality of transmission antennae, act as:
   an encoder coding the transmitted signals into a plurality of time-space codes;
   a spreader generating a plurality of spread signals by extracting a plurality of combinations of codes from the time-space codes and spreading the time-space codes by mapping a plurality of spread codes and each pair of the extracted time-space codes, each of the spread codes containing a combination of codes whose signs are alternately equal and opposite in units of specific spreading lengths for each of spread codes corresponding to different groups of a plurality of transmission antennae; and
   a transmitter transmitting the generated spread signals via the corresponding groups of the transmission antennae,
   wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

17. A non-transitory computer readable medium having embodied thereon a computer program for making a computer of a radio receiver, which receives signals via a plurality of transmission antennae, act as:
   a receiver receiving signals transmitted via a plurality of transmission antennae and outputting spread signals contained in the signals;
   a despreader restoring time-space codes by despreading the spread signals from the receiver in units of specific spreading lengths, based on one of a plurality of spread codes, each containing a combination of codes whose signs are alternately equal and opposite in the units of the spreading lengths for each of spread codes corresponding to different groups of the transmission antennae;
   a decoder decoding the restored time-space codes; and
   a mixer reproducing data by mixing the decoded time-space codes,
   wherein the signs of the codes in first and third partial spread segments of first spread codes corresponding to one group of the transmission antennae are the same as the signs of the codes in first and third partial spread segments of second spread codes corresponding to another group of the transmission antennae, and the signs of the codes in the second and fourth spread segments of the first spread codes are different from the signs of the codes in the second and fourth partial spread segments of the second spread codes.

18. The radio transmission method of claim 1, wherein said combination of codes comprises a set of sequentially alternating ones and negative ones.

* * * * *